US008248223B2

(12) United States Patent
Periwal

(10) Patent No.: US 8,248,223 B2
(45) Date of Patent: Aug. 21, 2012

(54) SPEED REPORTING FOR PROVIDING CONDITIONAL DRIVER TREATMENT

(76) Inventor: Neeraj Periwal, Campbell, CA (US)

( * ) Notice: Subject to any disclaimer, the term of this patent is extended or adjusted under 35 U.S.C. 154(b) by 431 days.

(21) Appl. No.: 12/583,526

(22) Filed: Aug. 22, 2009

(65) Prior Publication Data

US 2010/0045452 A1    Feb. 25, 2010

Related U.S. Application Data

(60) Provisional application No. 61/189,879, filed on Aug. 25, 2008.

(51) Int. Cl.
*B60T 8/32* (2006.01)
*G06Q 40/00* (2012.01)
*B60K 31/00* (2006.01)

(52) U.S. Cl. .......... 340/441; 340/905; 340/936; 701/70; 701/93; 705/4; 180/170

(58) Field of Classification Search .................. 340/435, 340/438, 439, 441, 466, 901, 902, 905, 936; 701/70, 93, 97; 180/170; 705/4
See application file for complete search history.

(56) References Cited

U.S. PATENT DOCUMENTS

| | | | | |
|---|---|---|---|---|
| 4,342,023 | A | * | 7/1982 | Tsunoda et al. ............. 340/460 |
| 5,315,295 | A | | 5/1994 | Fujii ............................ 340/936 |
| 5,357,438 | A | * | 10/1994 | Davidian ..................... 701/301 |
| 5,420,792 | A | | 5/1995 | Butsuen et al. ................ 701/96 |
| 5,485,161 | A | | 1/1996 | Vaughn ..................... 342/357.13 |
| 5,952,941 | A | * | 9/1999 | Mardirossian ............... 340/936 |
| 6,265,989 | B1 | | 7/2001 | Taylor ............................ 340/901 |
| 6,515,596 | B2 | | 2/2003 | Awada ............................ 340/905 |
| 6,563,426 | B2 | * | 5/2003 | Herzberg .................... 340/573.1 |
| 6,606,033 | B1 | * | 8/2003 | Crocker et al. ................ 340/901 |
| 7,176,813 | B2 | * | 2/2007 | Kawamata et al. ......... 340/995.13 |
| 7,346,439 | B2 | * | 3/2008 | Bodin ............................. 701/36 |
| 7,356,392 | B2 | * | 4/2008 | Hubbard et al. ............. 701/31.5 |
| 2004/0074122 | A1 | * | 4/2004 | Goodwin et al. ............... 40/592 |
| 2004/0153362 | A1 | * | 8/2004 | Bauer et al. ..................... 705/10 |
| 2005/0137757 | A1 | * | 6/2005 | Phelan et al. ..................... 701/1 |
| 2007/0027726 | A1 | * | 2/2007 | Warren et al. ..................... 705/4 |
| 2007/0038338 | A1 | * | 2/2007 | Larschan et al. .................. 701/2 |
| 2007/0188348 | A1 | * | 8/2007 | Bauer et al. .................... 340/905 |
| 2007/0213896 | A1 | | 9/2007 | Fischer .......................... 701/35 |
| 2008/0255888 | A1 | * | 10/2008 | Berkobin et al. ................ 705/4 |
| 2009/0079555 | A1 | * | 3/2009 | Aguirre De Carcer et al. ............................ 340/441 |
| 2009/0319095 | A1 | * | 12/2009 | Cech et al. ........................ 701/1 |

* cited by examiner

*Primary Examiner* — George Bugg
*Assistant Examiner* — Anne Lai
(74) *Attorney, Agent, or Firm* — Clay McGurk; The Law Office of Clay McGurk

(57) ABSTRACT

A business process is disclosed whereby the driver of a motor vehicle receives conditional treatment from an external organization based on his or her driving habits as recorded by a speed detection and logging system on the driver's vehicle and then transmitted to the organization. A government organization may provide a provisional or probationary license allowing a driver to operate a vehicle while the driver's driving habits meet certain requirements. An automobile insurance company may use this process to adjust insurance rates for a driver. A rental car company may use this process to offer lower rental rates and/or lower insurance rates to good drivers. A company employing professional drivers may use this process to monitor its drivers. Logs of driving habits, which may take into account weather conditions, may be shown using a map display in order to provide feedback regarding a driver's driving behavior.

20 Claims, 21 Drawing Sheets

Problem and Solution Overview

Speed Limit Database Example Records

Road Segment Records

| Segment ID | Endpoint 1 (N) | Endpoint 1 (W) | Endpoint 2 (N) | Endpoint 2 (W) |
|---|---|---|---|---|
| 100 | 37° 17'11.18" N | 121° 58'06.54" W | 37° 17'10.93" N | 121° 58'13.72" W |
| 200 | 37° 17'08.77" N | 121° 57'38.50" W | 37° 17'38.26" N | 121° 57'38.56" W |

Speed Limit Records

| Segment ID | Time Period Start | Time Period End | Speed Limit |
|---|---|---|---|
| 100 | 07:00:00 | 15:00:00 | 25 mph |
| 100 | 03:00:01 | 06:59:59 | 35 mph |
| 200 | 00:00:00 | 23:59:59 | 45 mph |

Figure 2a

Speed Limit Database Query Result

| Coordinates | Day and Time of Query | Applicable Speed Limit |
|---|---|---|
| 37° 17'11.00" N, 121° 58'10.00" W | Monday, 9:30 AM | 25 mph |
| 37° 17'11.00" N, 121° 58'10.00" W | Sunday, 9:30 AM | 35 mph |
| 37° 17'11.00" N, 121° 58'10.00" W | Tuesday 4:00 PM | 35 mph |

SPEED REPORTING FOR PROVIDING CONDITIONAL DRIVER TREATMENT

CLAIM OF PRIORITY

This application claims the benefit and priority of U.S. Provisional Application Ser. No. 61/189,879, filed on Aug. 25, 2008, and entitled "AUTOMATIC SPEEDING NOTIFICATION SYSTEM (ASPEN SYSTEM)," by inventor Neeraj Periwal, commonly assigned with the present application and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the field of automotive vehicles and systems incorporated within and communicating with automotive vehicles for purposes related to driver behavior, and to business and government organizations that may interact with vehicle and driver-related information, and with drivers themselves.

BACKGROUND

In the current status quo, while many people understand the dangers of traveling at high speeds (as well as realize the subsequent reductions in fuel economy), a considerable percentage of these drivers do not actually reduce their speeds to comply with the proper speed limit laws or adjust to their speeds appropriately in response to hazardous weather conditions. This may be due to a few factors: either complete unawareness of the current speed limit, lack of vigilance (e.g. little to no regulation by law enforcement agencies to ensure that drivers obey the speed limit), or general feelings of apathy towards obeying the law. In any case, a speeding driver is a danger not only to himself or herself, but also to others around him or her. Furthermore, studies have shown that speeding vehicles, especially on freeways, use much more fuel than vehicles traveling at or below the normal speed limit, which can severely impact the environment and economy. Finally, drivers who are not reminded of their speeding habits will inevitably continue to speed. Therefore, a solution is needed to get drivers to adhere to a safe speed while driving by alerting them in a conspicuous manner of their speeding—and, if necessary, by forcibly reducing their vehicles' speeds.

Additionally, drivers who habitually speed often incur penalties relative to their encounters with law enforcement agencies. For instance, in many states, speeding in excess of 20 mph over the speed limit can not only produce an expensive speeding ticket, but may also cause the driver's license to be suspended for a certain period of time. When this happens, the driver has no recourse but either to cease his or her driving activities or to break the law by continuing to drive. If the commute to the driver's work location is substantial, or alternative commuting methods are inconvenient, the driver may be placed in a substantial predicament and his or her livelihood may be threatened. Furthermore, drivers currently have no means by which to review, and thereby improve, their driving habits, and/or to enable them to be more cautious in geographical areas where they are most vulnerable to speeding infractions.

Moreover, drivers who habitually speed and incur an excessive number of traffic tickets may also find their insurance premiums substantially increased. Again, there is currently no recourse that can reverse the negative effects of this penalty.

Thus, a speed reduction, alerting, and logging system is needed that provides improved feedback to a driver under a variety of conditions, reduces the vehicle's speed if necessary, logs data related to the driver's speeding habits, allows the driver to review his or her overall speeding habits in a useful way, and automatically transmits this speeding data to external entities such as law enforcement agencies and insurance companies, in order to enable the driver to obtain some form of preferred treatment by those agencies or companies in exchange for the reduction or elimination of speeding habits.

SUMMARY OF THE INVENTION

The business process invention described herein includes a Speed Reduction, Alerting, and Logging System (hereinafter, SPIRAL System) that solves the long-lasting problem of drivers being ignorant of violating speed limits and thereby presenting a danger to themselves and the people around them. The SPIRAL system also enables drivers to improve their driving habits. Additionally, the SPIRAL system can enable drivers to automatically report their driving habits to a remote agency, company, or other external organization in order to receive some benefit, preference, or other conditional treatment by doing so, thus facilitating a business process that may benefit the driver, the external organization, or both.

By including the functionalities of a location detection device (such as a GPS-equipped device) and a speed detector in concert with a speed limit database management system, the present invention offers an innovative solution to instantaneously notify drivers of the current speed limit and when they violate it, as well as a means by which their speeding violations can be logged and/or transmitted and their speeds reduced when necessary. This solution has been described to be configurable in many different ways. Many more variations of such devices and configurations are possible within the scope of the present invention.

Many other benefits, beyond the primary goal of safety, may be achieved through the use of the present invention. The analysis of speeding data may be used to improve a person's driving habits and may be advantageous to a driver with regards to his or her dealings with law enforcement agencies and/or automobile insurance companies. Finally, studies have consistently shown that drivers who obey the speed limit save not just fuel and the environment, but save lives as well.

One object of the present invention is to help drivers obey speed limit laws by alerting them when they drive over the speed limit, by helping them keep track of their speeding infractions, and by reducing their vehicle's speed if necessary. An alert condition may result from the driver exceeding the legal speed limit, or a modified adjusted or advisory speed limit, on a particular segment of road. A driver is notified through detectable signals if his or her vehicle exceeds the specified speed limit of the particular segment of the road the vehicle is currently traversing. The system takes into account speed limits that vary with the time of day, day of the week, or date, and also speed limits that vary with the type of vehicle. The system may alert the driver of his or her speed condition when the driver reaches the speed limit or when he or she passes a preset threshold above or below the legal speed limit. The system may provide the driver with the current speed limit of the road he or she is currently traversing. The system may also allow the driver to exceed the speed threshold for a temporary period of time for a variety of reasons—for example, in order to allow the driver to overtake another vehicle or to merge into traffic—without incurring an alert.

Another object of the present invention is to take into account local weather conditions either in the region where the vehicle is operating or, better still, at the precise location of the vehicle, and to use this information to adjust the alert thresholds relative to the posted speed limit on the current road, and/or present an advisory speed limit to the driver that is reduced relative to the posted speed limit. If the SPIRAL System as implemented has the capability of presenting the current posted speed limit, it may simultaneously display both the posted limit and weather-adjusted advisory limit to the driver. Determining weather conditions at a vehicle's location may be performed by means of a variety of sensors and/or sensing systems included in the vehicle and/or through the utilization of an online database updated in real-time with which the vehicle-mounted system communicates, with said online database containing the current weather conditions (rain, sleet, snow, icing, high winds in certain directions, etc.) at the driver's particular location.

Another object of the present invention is to provide an indication or alert to the driver in several ways that ensure that the driver does not ignore or miss a speed alert. These alert types include audio, visual, kinesthetic, olfactory, and other sensory means. Also included is the ability for an alert notification indicator to vary in intensity according to the severity of the alert condition causing the alarm. An alert notification indicator may also vary in intensity in response to the ambient conditions of the driver's environment.

Another object of the invention is to force a reduction in the speed of the vehicle should the vehicle reach a preset speed threshold at or relative to the speed limit.

Another object of the invention is to log or record the driver's behavior relative to vehicle speeds and speed limits over a period of time, and provide methods by which the driver's behavior may be examined in order to improve the driver's driving habits and/or reduce the probability of incurring an infraction. To this end, the degree to which a driver obeys or does not obey legal speed limits in different geographical regions within the territory he or she normally drives in may be displayed on a map in a manner that allows easy recognition of places he or she normally tends to speed. This map may be presented in a variety of different ways.

Another object of the invention is to automatically log and report to an outside agency or company via a remote data connection a driver's behavior relative to speeds and speed limits. There are a number of scenarios where this may prove useful: for example, a driver may be provided with a benefit or preference relative to his or her interactions with outside entities such as law enforcement and government organizations and/or insurance companies.

A commercial trucking company or any company that uses vehicles for transporting goods or for other means (such as a taxi driving company) can use the SPIRAL System for monitoring its drivers to determine how safe the drivers' driving habits are. Furthermore, companies that loan vehicles out to drivers (such as rental car companies) may use the SPIRAL System to monitor drivers as well as use alert condition logs to determine the rental charges incurred by a driver. Beyond a certain age, individuals sometimes become ineligible to rent from some car rental companies. The installation of the SPIRAL System on a rental car could enable rental car companies that would normally not rent to elderly persons beyond a certain age limit to allow elderly persons to rent with probationary treatment as long as their driving habits—as logged and reported by the SPIRAL System—are within the limits of certain rules. When a driver's vehicle is equipped with the SPIRAL System, the driver may also have his or her rental rates increased as a result of speeding based on alert condition logs supplied by the System.

Relative to law enforcement agencies, the system described herein can be used to monitor a driver who is under a probationary status to determine if he or she is consistently driving in a safe manner, and therefore deserves special considerations in return. One example of such a probationary status might be a person whose driver's license has been suspended for a severe moving violation, or multiple moving violations, but with proof of safe driving might be allowed to continue to drive as long as he or she meets a set of probationary rules. This would allow a person to keep driving when an inability to drive would cause severe hardship to himself or herself or the driver's family. Another probationary scenario might include a new driver who is operating under a learner's permit or a provisional, age-restricted license for young people. Often these new drivers and/or young drivers are restricted to operate with certain restrictions with regard to time of day and or the presence of an appropriate licensed driver riding with them. If the system described herein is attached to new and/or young drivers' vehicles and is in communication with the local DMV (Department of Motor Vehicles), it could be used to monitor the behavior of individuals operating under a learner's permit or a provisional license and therefore allow them more freedom given that they adhere to a set of probationary rules. It may also enable them to transition to a full driver's license at an earlier time. When their vehicle is equipped with the SPIRAL System, a driver may also be issued tickets for speeding based on alert condition logs supplied by the System.

When the SPIRAL System is present in a vehicle, law enforcement agencies can use transmitted speed log information not only for initiating and maintaining a probationary period, but could also use the speed log information for issuing warnings or even tickets. To facilitate these processes, it may be useful to include a mechanism as part of or in conjunction with the SPIRAL System to identify the driver, such as a fingerprint reader or a device that scans a driver's license. While this may not necessarily identify the current driver of the car, it does identify that the probationary driver is most probably in the vehicle and is therefore allowed to be in control of the vehicle. A more complex solution would include biometrics that can uniquely identify that the driver in question is actually sitting behind the wheel. Such identity of a driver can be determined by the Driver Identification System.

To uniquely identify the car, it is possible to connect with the car's OBD (On Board Diagnostic) connector on cars manufactured since 1982. This can provide electronic access to the VIN number of the car. The OBD interface may provide other vehicle related information that can be useful for the SPIRAL System.

Another age-related probationary process that can take advantage of the SPIRAL System involves the elderly. In some states and countries, drivers may lose their licenses after passing a certain age. A probationary process using the SPIRAL System can be implemented to allow elderly drivers to continue driving under probation. This may include not only that they obey the speed limits, but that they also maintain a rate of speed that safely keeps up with traffic.

Relative to insurance companies, the system described herein can log parameters indicating a driver's speeding behavior and automatically report this data to an insurance company. In return, the insurance company may provide reduced premium rates for that individual. Regarding the ability to mitigate restrictions or penalties imposed on a driver after he or she has had speeding violations and/or accidents, the present invention may be used to monitor such a driver in a probationary sense, providing ongoing information to an insurance company regarding the driver's safe driving behavior, thus enabling the driver to avoid an increase in premiums as a result of an accident or moving violation record as long as he or she exhibits a pattern of driving behavior that meets certain requirements, such as obeying a set of probationary rules for complying with speed limits, properly reducing speeds in adverse weather conditions, or maintaining minimum speeds. Should a driver habitually speed while being monitored by the SPIRAL System, the insurance company may decide to increase the driver's premiums instead.

The SPIRAL System may also be used to report to government/DMV agencies the number of miles driven in a particular vehicle in addition to the driving habits of the driver. Drivers may then be taxed (DMV renewal for a particular vehicle) according to the number of miles driven with a particular vehicle, and also may have registration fee rate reductions on one or more vehicle(s) according to proof of safe driving provided through SPIRAL System data logs that have been automatically supplied to the agency. When their vehicle is equipped with the SPIRAL System, a driver may also be issued tickets for speeding based on alert condition logs supplied by the System.

BRIEF DESCRIPTION OF THE DRAWINGS

FIG. 2a shows examples of records that may be stored in a speed limit database.

FIG. 3a shows an example result of a speed limit database query.

DETAILED DESCRIPTION OF THE INVENTION

Figure 1:
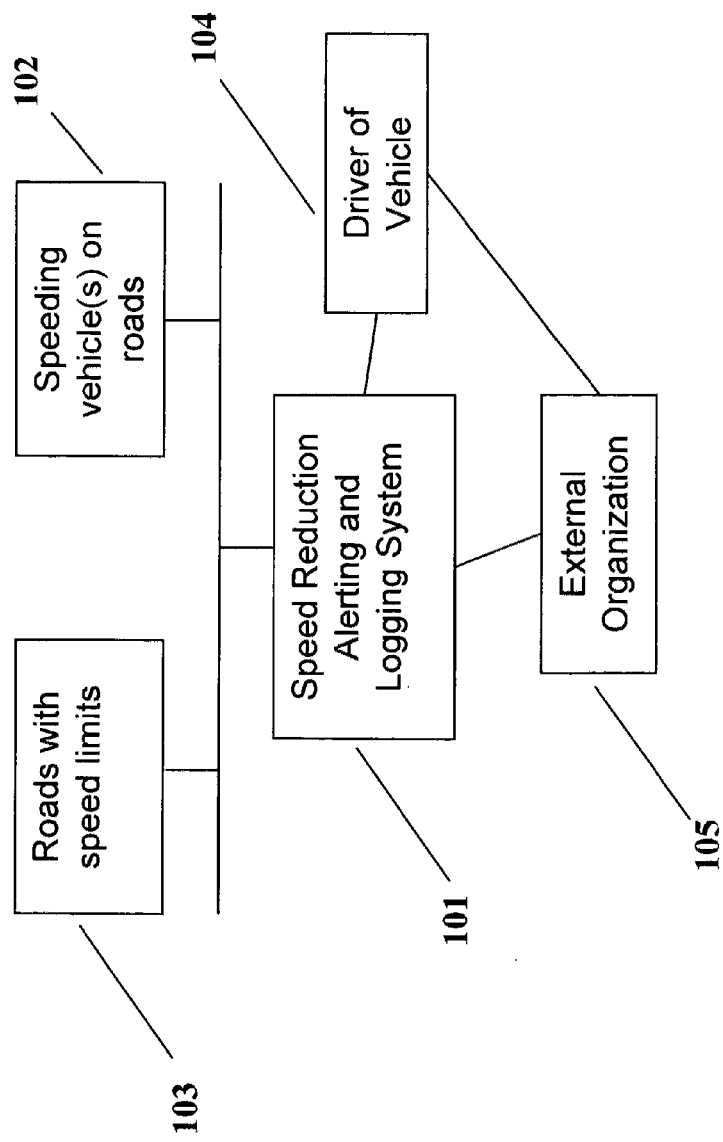
FIG. 1 shows an overview of the problem and solution.

FIG. 1 provides a high-level view of the problem and the solution provided by the SPIRAL System. The SPIRAL System 101 interfaces with a vehicle 102 which may at times be speeding. The SPIRAL System accesses a database providing speed limits on different roads 103. The SPIRAL System furthermore interfaces with the driver 104 of the vehicle, and may also interface with an external organization 105 with which the driver may interact.

Figure 2:
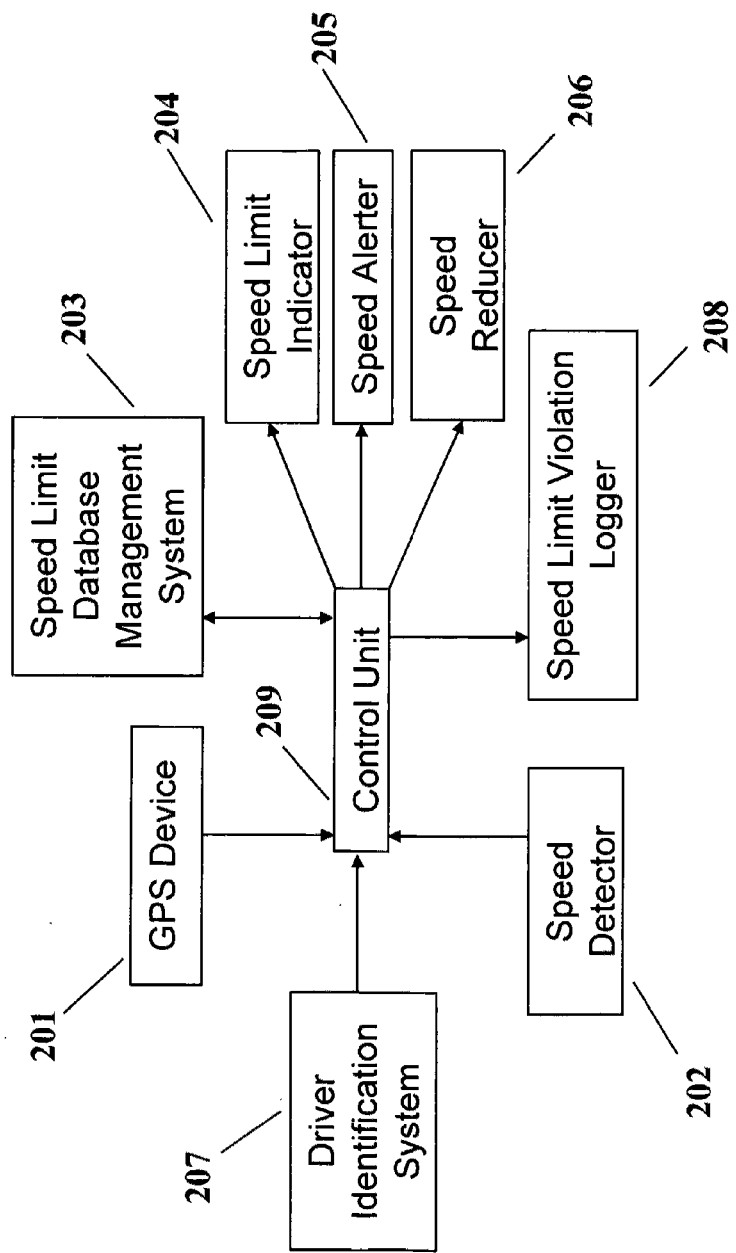
FIG. 2 shows the main components of the SPIRAL System and how they work together.

FIG. 2 shows a high level description of the main components that comprise the SPIRAL System. It should be understood that while these items are referred to as components, that they may exist either as physical components or as logical functionalities that may be included or combined in a single physical component. To the extent they exist as separate physical components, they may be combined and packaged in different manners and still fall within the scope of this specification. A description of these components/functionalities follows:

- A GPS (Global Positioning System) Device 201, an apparatus that gives the geographic location (through longitude and latitude positions) of the vehicle.
- A Speed Detector 202 that detects and provides the current speed of the vehicle.
- A Speed Limit Database Management System 203 that maps and keeps track of the speed limits of all roads within a geographic region, and can be queried to provide such data based on the location of the vehicle, the type of vehicle, the time of day, and other factors.
- A Speed Limit Indicator 204, which provides the driver of a vehicle with the speed limit of the current road segment being traversed.
- A Speed Alerter 205, which uses sensory (e.g. audio, visual, kinesthetic) signal(s) to notify the driver of a speed violation.
- A Speed Reducer 206, a system that uses electromechanical means to physically or electronically force the vehicle to slow down in order to meet the posted speed limit if the driver fails to slow down the vehicle.
- A Driver Identification (DID) System 207 that identifies the driver; in one embodiment, the DID confirms that the driver in question is in the vehicle, while in another embodiment, the DID verifies that the driver in question is, in fact, sitting behind the wheel and is controlling the vehicle.
- A Speed Limit Violation Logger 208, which tracks, records, and indexes information about a driver's speeding violations and can later be accessed to examine the person's driving habits and behaviors.
- A Control Unit 209 that continually does the following: collects the current geographic location data of the vehicle from the GPS Device, collects the current weather conditions, queries the Speed Limit Database Management System for the current speed limit of the segment of the road the vehicle is traveling on, provides the driver with the current speed limit through the Speed Limit Indicator, collects the current speed of the vehicle from the Speed Detector, and, if necessary, activates the Speed Alerter and/or triggers the Speed Reducer and/or records speeding data, with DID and other information, into the Speed Limit Violation Logger.

FIG. 2 depicts the aforementioned components and functionalities working together as a system. Note that various combinations of these components and functionalities (all or a subset) may be combined in different ways to provide different sets of overall functionalities and/or physical packaging arrangements.

GPS (Global Positioning System) Device

The GPS Device 201 provides the current geographic location (through longitude and latitude positions) of the vehicle. It may be one of the following:

- A GPS system installed (permanently) in the vehicle
- A standalone, detachable GPS unit (e.g. a device manufactured by companies such as Magellan, Garmin, or TomTom) currently present in the vehicle.
- A mobile device (such as a mobile phone) equipped with a GPS sensor and currently present in the vehicle
- Any other device that can track the position of an object (in this case, a vehicle) through the use of GPS technologies If a mobile phone is used as a GPS Device, the phone may use Assisted GPS, or A-GPS—a combination of location detection through GPS satellite signals as well as those obtained through cellular telephone triangulation methods—in order to provide a quicker and potentially more accurate location of the vehicle. A-GPS is useful when conventional GPS signals are obstructed by trees, tall buildings, or other uncontrollable physical and natural objects, and can often result in a quicker and more accurate location result. However, if the device is not equipped with traditional GPS and only with A-GPS, it may not function properly as a location detection device in the event of little or no cellular phone network reception. For this reason, the GPS Device should optimally be equipped with at least traditional GPS, even if it does have A-GPS capabilities as well; thus, even if A-GPS cannot function due to a loss in cellular reception, regular GPS technology will still be able to track the location of the vehicle. The GPS Device may use wired or wireless connections to provide the current location data of the vehicle.

Speed Detector

The Speed Detector 202 is used to determine the speed of the vehicle at any given moment. Several different methods, including (but not limited to) those described in the following examples, may be used to find out this speed. GPS satellites may lock onto the position of the GPS Device and track its motion in order to detect the speed of the vehicle, hence allowing the GPS Device to act as the Speed Detector. Alternatively, the Speed Detector may be built-in (that is, permanently integrated with the vehicle) and may interface directly with the speedometer to accurately measure the exact speed of the vehicle at any moment. A Speed Detector may also utilize radar, laser, sonic, optical, motional, or other technologies to determine the current speed of the vehicle. Yet another method of determining the speed of a vehicle may be implemented. A GPS-equipped unit may work in conjunction with a precise clock to determine the distance that the vehicle travels in a certain short measured period of time; then, the formula of distance/time can be used to determine the speed of the vehicle in real-time. As mentioned before, the Speed Detector may be built-in to the vehicle; alternatively, it may be physically separate from the vehicle. The Speed Detector may use wired or wireless data communication protocols to provide the current speed data.

Speed Limit Database Management System

The Speed Limit Database Management System 203 maps and keeps track of the speed limits of all roads within a geographic region, and can be queried to provide such data based on the location of the vehicle and, optionally, the type of vehicle and/or the time of day and/or date. The database may be loaded onto a GPS satellite (or satellites), loaded onto the GPS Device, or located in or on another device (or devices). The database may store information about different speed limits on different segments of roads within a geographic region. The database mentioned above may be implemented using a relational database management system and may be manipulated using SQL (Structured Query Language). Alternatively, the database may be organized through a Comma-separated values, or CSV, file. Other methods of data storage and retrieval may be used for the database as well.

Such databases as those provided by third party providers like NAVTEQ, which already contain speed limit data for different roads, may be used for this purpose.

Alternatively, if no such databases are already available or provide sufficient information, a new database or databases may be populated with speed limit data by overlaying a map of speed limits onto a road map of a given geographic region, thereby creating a relationship between the geographic location and the applicable speed limit at that location. As mentioned earlier, the speed limits may be further qualified based on the type of vehicle and/or the time of day and/or date.

Before the Speed Limit Database Management System may be queried to provide the speed limit of a specified road segment at a specified time of day and/or on a specific date, the speed limit database must be populated with the necessary data. There are many different ways to populate the database with the appropriate information; the following description is provided only as an example, and does not constitute the only method by which data may be entered into the database or how this data may specifically be used. One method of achieving this data population may involve overlaying computer-generated road maps that are already equipped with coordinate data (such as those found in computer mapping programs like or similar to Google Earth) with specific end points of road segments where speed limits or directions change.

As shown in FIG. 2a, road segment records 210 may be recorded in the database including, among others, the following information:

- Segment ID: To uniquely identify the road segment
- Endpoint 1 (N): The North (latitude) coordinate value of the first endpoint of the road segment
- Endpoint 1 (W): The West (longitude) coordinate value of the first endpoint of the road segment
- Endpoint 2 (N): The North (latitude) coordinate value of the second endpoint of the road segment
- Endpoint 2 (W): The West (longitude) coordinate value of the second endpoint of the road segment For each such road segment, one or more speed limit records 211 may be recorded in the database including, among others, the following information:

- Segment ID: To uniquely identify the road segment
- Time Period Start: The starting time of day for a particular speed limit
- Time Period End: The ending time of day for a particular speed limit
- Speed Limit The applicable speed limit during the time period between Time Period Start and Time Period End Therefore, for each road segment, there may be a separate speed limit record for each unique combination of Time Period Start and Time Period End values. For example, if a road segment has a constant speed limit throughout an entire day, it will have only one speed limit record. However, if a road segment has two different speed limits—one from 7:00 AM to 3:00 PM and the other for the rest of the day—it will have two different speed limit records. For example, suppose a road segment (Segment ID=100) in front of a school on West Campbell Avenue, Campbell, Calif. 95008 has a speed limit of 25 mph (miles per hour) during school hours (7:00 AM-3:00 PM) and otherwise 35 mph. Meanwhile, a different road segment (Segment ID=200) on San Tomas Expressway, Campbell, Calif. 95008 may have a speed limit of 45 mph at all times. For these road segments, the following records would be entered in the database as shown in FIG. 2a.

When the Speed Limit Database Management System is queried with the coordinates of a location, those coordinates may first be mapped into a road segment record such that the given coordinates either fall into or are very close to the line segment between the recorded end points of that road segment. One may use the equation of a line corresponding to a road segment to check if the given location belongs to that road segment. Using the Segment ID of such a road segment record, the corresponding speed limit record may be found based on the specified time of day. This speed limit record will provide the applicable speed limit value.

The Speed Limit Database Management System may be provided the vehicle type by the Control Unit and may store a separate set of speed limit information for each individual type of vehicle. For example, a speed limit of 55 mph is imposed for many large trucks and trailer-towing vehicles on most freeways, as opposed to the usual speed limit of 65 mph for normal vehicles. In this case, the Speed Limit Database Management System would store the 55 mph speed limit data and send this information back to the Control Unit if the Control Unit reports that the vehicle is a large truck or trailer-towing vehicle; therefore, the driver of the truck or trailer-towing vehicle would be alerted that the speed limit on the freeway is 55 mph. If, however, the Control Unit reports that the driver is operating a normal vehicle on the freeway, the Speed Limit Database Management System will store the regular 65 mph speed limit and report this speed limit to the driver.

Figure 3:
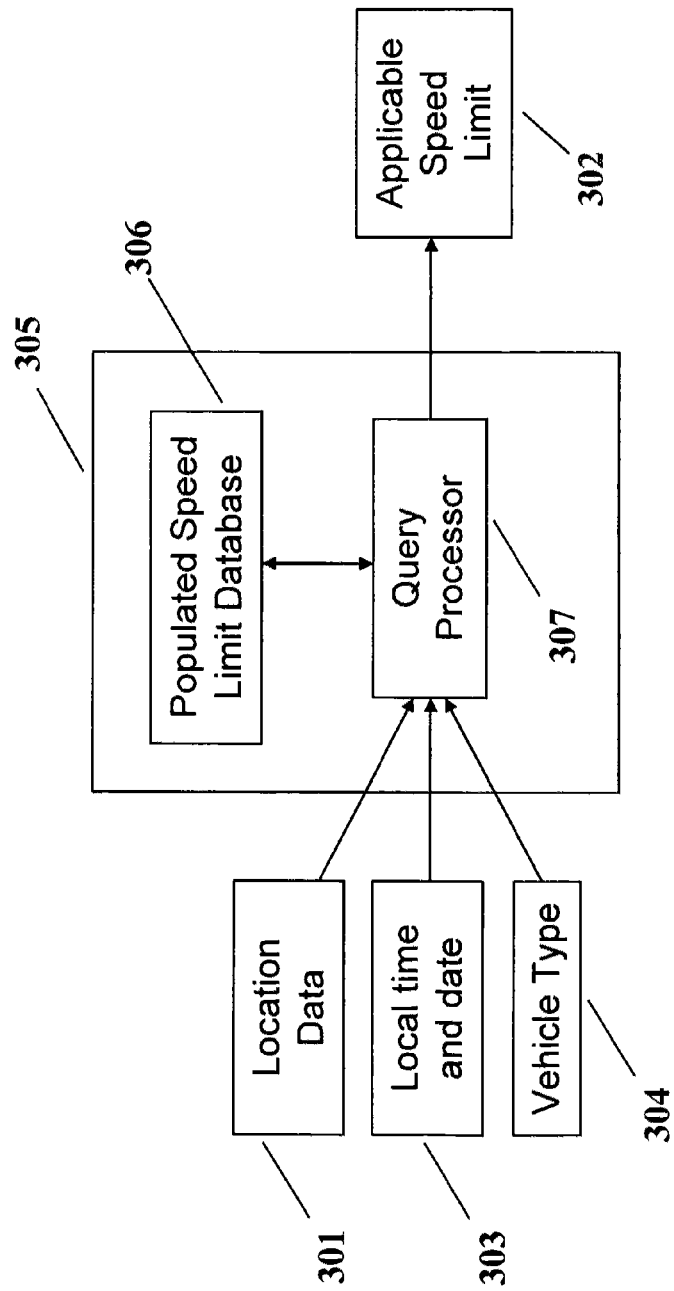
FIG. 3 describes the operation of the speed limit database management system.

The diagram of FIG. 3 provides a high-level overview of how the Speed Limit Database Management System processes queries for speed limits. The speed limit records may further be enhanced to store applicable days for different speed limits. For example, the Speed Limit Database Management System may record that the special speed limit during school hours (7:00 AM to 3:00 PM) is applicable only from Monday to Friday or only during weeks and/or months when school is in session. In view of the above description and examples, if the location data 301 comprising latitude and longitude coordinate values of 37°17'11.00" N, 121°58'10.00" W belong to road segment 100 in front of the school on West Campbell Avenue, Calif. 95008, then the applicable speed limit values 302 shown in FIG. 3a will be returned by the Speed Limit Database Management System when queried.

There are many ways for the Speed Limit Database Management System to detect the current local time and date 303 in the region in which the vehicle is traveling; the following examples do not constitute the only ways in which the local time at the vehicle's location may be derived. The Speed Limit Database Management System may use the geographic coordinates of the vehicle, derived originally by the GPS Device and sent to the Speed Limit Database Management System by way of the Control Unit, to determine the time zone in which the vehicle is currently in. Then, using Greenwich Mean Time (or some other time zone) as a reference, the Speed Limit Database Management System may determine the exact local time and date information by adding or subtracting hours from the neutral time zone in relation to the time zone in which the vehicle is currently located. Optionally, the Speed Limit Database itself may store information about the different time zones that roads are located in; this way, rather than needing to query the time zone of the vehicle's location every instance the vehicle's location changes in order to determine the local time and date, the time zone information may be determined at the same instance the speed limit of the current road is derived from the Speed Limit Database. Finally, as described further in the description of the Control Unit, the Control Unit may provide the local time and date through the use of a clock.

The Speed Limit Database may need to be updated if and when speed limits within a specified geographic area are added, modified, or deleted. Such a database may be accessed using wired or wireless data communication protocols, such as (but not limited to) Wi-Fi or cellular radios.

Vehicle type 304 may be a configurable parameter within the system, or alternatively may be determined automatically if the system has access to the vehicle's OBD system. The SLDBMS 305 contains a populated speed limit database 306 and query processor function 307.

Speed Limit Indicator

The Speed Limit Indicator 204 provides the driver the speed limit of the road that the vehicle is currently traversing. By giving the driver a clear indication of the current speed limit, the Speed Limit Indicator allows the driver to confidently drive his or her vehicle at a safe speed. The Speed Limit Indicator may be built-in to the GPS Device, the Speed Alerter, the Speed Detector, the vehicle itself, another device in close proximity to the driver (such as a mobile phone, car stereo system, or steering wheel), or may constitute a separate device in and of itself. The Speed Limit Indicator communicates with the Control Unit to gain the speed limit on the road that the vehicle is currently traversing; as detailed later, this speed limit may be manipulated based on weather conditions and/or user inputs and/or other factors. Through visual and/or audible means, the Speed Limit Indicator provides the driver with this speed limit information. In the case of a visual display, the current speed limit would simply be shown on the screen of the Speed Limit Indicator at all times. Two types of audible alerts are possible:

1) Changed Speed Limit Indicator: Each time the speed limit changes, the Speed Limit Indicator audibly provides the current speed limit.
2) Periodic Speed Limit Indicator: The speed limit of the current road is audibly provided at given intervals (e.g. every ten [10] seconds).

Both the Changed Speed Limit Indicator and the Periodic Speed Limit Indicator may be used individually or in combination.

The Speed Limit Indicator may also provide an adjusted or advisory speed limit that has been altered as a result of certain parameters. These parameters may include those such as local weather conditions whereby an adjusted or advisory speed limit may be reduced relative to the legal limit according to the severity of the weather conditions and/or adjustments based on other factors, such as driver inputs.

Speed Alerter

The Speed Alerter 205 notifies a driver when the vehicle exceeds the speed limit. The Speed Alerter uses sensory indications to alert the driver in case of a speed limit violation. These indications may be of an audio, visual, kinesthetic, olfactory, or other sensory nature. They may be activated either independently or in combinations of more than one at a time. An example of an audible signal may be a beeping sound emitted from the GPS Device, the car stereo system, or another device in close proximity to the driver. This sound may dynamically change based on the severity of the speed violation; for instance, the frequency, pitch, and/or loudness of the beeping sound may increase if the driver increases the vehicle's speed over the speed limit, while the opposite effect (less frequent and/or quieter beeps) may be observed if the driver reduces the amount by which the vehicle is exceeding the speed limit. The volume and/or frequency of an audible signal may be user-configurable and/or may respond to the level of sound in the ambient environment. For example, in order to ensure that a driver can hear the Speed Alerter even when he or she is playing his or her music at a loud volume, the sounds emitted from the Speed Alerter for a speed violation of ten (10) mph may be louder than those emitted if the same violation was committed in a quieter environment. A visual indicator may consist of a flashing light or a set of lights visible, yet non-distracting (for safety reasons) to the driver, that may flash with greater frequency and/or greater brightness when the driver's speed over the speed limit increases and may flash with a lesser frequency and/or lesser brightness when the driver reduces the vehicle's speed. This (these) light(s) may change color(s) depending on the level of the speed violation; for example, if a vehicle is exceeding the current speed limit by less than ten (10) mph, the color of the light(s) may be yellow, while this color may change to red if the vehicle exceeds the current speed limit by greater than ten (10) mph. These and/or other visual cue(s) may come from a set of light embedded within the vehicle, from the GPS Device, or from another device in close proximity to the driver, such as a mobile phone.

Furthermore, one or more entities may display any visual cues at any given moment; for example, an alert may be shown on both the driver's mobile phone and through a set of lights embedded within the vehicle, or it may only be shown on the driver's mobile phone. The visual indicator may also be user-configurable and/or may respond to the ambient lighting near the driver. For example, if one is driving at night and the inside of the vehicle is dark, the visual indicator may be less brighter in order to avoid being distracting or blinding to the driver, while the visual indicator may become brighter in broad daylight. A kinesthetic signal to alert the driver of the vehicle's speed limit violation may consist of a slight vibration of the steering wheel; of the driver's seat; of the physical wheel(s) of the vehicle by means of the wheels themselves, the axles of the car, or through other means (similar, in a sense, to the vibration sensation one feels on the highway when one accidentally veers off the road onto the shoulder); or of the GPS Device or another object (such as a mobile phone or Bluetooth headset) in close proximity to the driver. An example of an olfactory signal may be a scent that is released within the vehicle that increases in intensity as the vehicle's speed over the speed limit increases and decreases as the vehicle's speed is reduced. The functionality of a Speed Alerter may be built into a number of devices, such as a mobile phone, a vehicle's audio system, a GPS Device, or another piece of physical equipment. The Speed Alerter may be activated through wired or wireless data communication protocols, such as (but not limited to) Bluetooth or Wi-Fi. For example, a driver's Bluetooth-enabled mobile phone or Bluetooth over-the-ear headset may be used as a Speed Alerter.

One may also configure the Speed Alerter to be activated at certain speeds above or below the actual speed limit. For example, a parent whose child is beginning to learn how to drive may configure the Speed Alerter to alert the driver when the vehicle's speed comes within five (5) mph of the actual speed limit (e.g. at 30 mph on a road with a 35 mph speed limit). Alternatively, an experienced driver who feels comfortable traveling at a speed slightly over the limit may configure the Speed Alerter such that it is activated only when the vehicle's speed exceeds the actual speed limit by a custom-defined value. In all cases, the GPS Device, Speed Detector, Speed Limit Database Management System, Speed Limit Indicator, Speed Alerter, Speed Reducer, Speed Limit Violation Logger, Driver Identification System, and Control Unit all continue to work in sync, while the user has the ability to determine at which speed(s) above or below the speed limit the Speed Alerter should be activated.

Furthermore, the Speed Alerter may be configured such that it is activated only if the vehicle exceeds a given speed, such as the speed limit, for the full duration of a certain period of time. For example, a driver may configure the Speed Alerter such that it is activated only if the vehicle violates the speed limit for at least ten (10) continuous seconds. In this case, if the vehicle's speed exceeds the current speed limit for a duration of time less than ten (10) seconds (for instance, six [6] seconds), the Speed Alerter will not be activated. This configuration of the Speed Alerter may occur in several ways; for example, the driver may physically push and/or hold a button or use voice commands to temporarily disable the Speed Alerter. Alternatively, the Speed Alerter may also have a mode in which it always allows alert conditions to be deferred for a temporary period of time with no specific action required by the driver to temporarily disable the Speed Alerter. Regardless of implementation, this option allows for situations in which a temporary increase in speed may be necessary while an alert is not desired; for example, a driver may need to speed up in order to overtake another vehicle while changing lanes or merge into traffic.

Speed Reducer

The Speed Reducer 206 uses electromechanical means to physically or electronically force the vehicle to slow down. The Speed Reducer receives an input from the Control Unit to determine if it should be activated. The Control Unit may be configured to activate the Speed Reducer only if the vehicle's speed exceeds the speed limit for a certain amount of time (e.g. at least for ten [10] seconds) and/or if the driver exceeds the speed limit by a certain amount (e.g. a speed greater than or equal to more than 15 mph over the limit). Alternatively, the Speed Reducer may receive the speed limit of the road currently being traversed and the current speed of the vehicle to determine whether it should activate itself. One may configure the Speed Reducer in these and other regards by configuring the Speed Reducer directly; for example, one may configure the Speed Reducer to activate only if the vehicle's speed exceeds the speed limit for a certain amount of time (e.g. at least for ten [10] seconds) and/or if the driver exceeds the speed limit by a certain amount (e.g. a speed greater than or equal to more than 15 mph over the limit). Once the Speed Reducer is activated and the vehicle begins to slow down, the Speed Alerter may be deactivated or continue to remain activated until the vehicle's speed no longer exceeds the speed limit. Furthermore, the driver may be alerted that the vehicle's speed is being manipulated by the Speed Reducer through visual, audible, kinesthetic, and/or other sensory means that may be activated in combination or individually. The Speed Reducer may be turned on and off as desired and/or needed.

One way to implement the Speed Reducer could be by following the methods and apparatus as described by Yutaka Fujii in U.S. Pat. No. 5,315,295 as issued by the USPTO on May 24, 1994, in which a throttle activator and/or brake activator are used to forcibly apply the brakes to a vehicle to reduce its speed. Alternatively, the Speed Reducer may function by following the methods and apparatus as described by Butsuen, et al in U.S. Pat. No. 5,420,792 as issued by the USPTO on May 30, 1995, in which hydraulic systems are used to slow the vehicle, thereby reducing its speed. Other methods of physically or electronically forcing the vehicle to slow down may possibly be used as well.

Driver Identification (DID) System

A Driver Identification (DID) System 207 identifies the driver. The DID may be optionally provided in addition to any other components and/or functionalities of the SPIRAL System. Thus, the DID is not included in all of the diagrams in the figures.

In one embodiment, the DID confirms that the driver in question is in the vehicle, while in another embodiment, the DID verifies that the driver in question is, in fact, sitting behind the wheel and is controlling the vehicle. The DID may include a fingerprint reader or other biometric device such as a retina scanner that can be used to validate that the driver is present in the vehicle. Other embodiments may include the fingerprint scanner constructed integrally with the steering wheel to ensure that the identified person is, in fact, driving the vehicle. A retina scanner may be positioned so as to accomplish the same goal. Additionally, an image recognition camera positioned so as to view the driver's face may be used to validate the driver.

Speed Limit Violation Logger

The Speed Limit Violation Logger 208 tracks, records, and indexes a vehicle's speeding data. This data may include the identity of the driver, as provided by the Driver Identification System (DID), the vehicle identification number (VIN), the time of a speeding violation, the time duration of the speeding violation, the location of the speeding violation, the actual speed driven while committing the infraction, the legal speed limit that was violated, the amount of the speeding violation (the actual speed of the vehicle minus the legal speed limit), and other information. This information may be useful for a variety of purposes. For example, a driver may analyze the logs of speeding data generated by the Speed Limit Violation Logger to improve his or her driving habits by keeping track of where he or she speeds most often, by examining how much he or she speeds at certain locations and/or times, and using this data to take proactive steps in order to become a safer driver. The Speed Limit Violation Logger may store information in a variety of ways, such as in comma-separated value (CSV) files, or in a relational database management system that may be manipulated using SQL (Structured Query Language). These logs may be indexed and searched for certain parameters; for example, one may search logs generated by the Speed Violation Logger for certain locations or instances in which one's speed exceeded the speed limit by a certain amount, or may sort the speeding records based on the severity of those violations. Various useful reports may be generated and analyzed using the data procured from the Speed Limit Violation Logger; for example, one may choose to find all instances of speeding within the last week or last month, and may further qualify these searches based on the severity of the violations, locations of the violations, or other factors. One may utilize a map display to intuitively view the speed habits of a driver on a map. Furthermore, the speeding logs may optionally be used for law enforcement purposes. In addition, automobile insurance companies can use data provided by the Speed Limit Violation Logger to adjust insurance premiums based on how safely their customers drive or for other purposes. Moreover, information from the Speed Limit Violation Logger may used by the operator(s) of a chain of fleet vehicles in order to track the speed habits of the chain's drivers, who may be limousine drivers, taxi drivers, goods transportation drivers, etc. Overall, the degree to which a driver's driving behavior reflects concern for safety, specifically obeying speed laws, may be tracked over a period of time by the Speed Limit Violation Logger in order to generate an evaluative pattern of driving behavior for the driver. The Speed Limit Violation Logger may be turned on or off either directly, through the Control Unit, or by other means (such as through remote control), as desired and/or needed. The Speed Limit Violation Logger may transmit information to or may be accessed from another source using wired or wireless data communication protocols, such as (but not limited to) Wi-Fi or cellular radios.

Control Unit

The Control Unit 209 is the main driving component of the SPIRAL System. It provides the core functionality of controlling the Speed Limit Indicator 204, Speed Alerter 205, Speed Reducer 206, and Speed Limit Violation Logger 208 by seamlessly processing inputs from the GPS Device 201, the Speed Detector 202, the Speed Limit Database Management System 203, and the Driver Identification System 207. The Control Unit has communication capabilities—both the ability to send and receive data/signals through wired or wireless data communication protocols to and from other components that comprise the SPIRAL System. The Control Unit, which may be located within or outside the vehicle or another device, receives location data from the GPS Device and vehicular speed information from the Speed Detector. The Control Unit additionally receives information regarding the current driver through the Driver Identification System if a DID is present. The Control Unit may also be provided the type of vehicle that the SPIRAL System is being used in, such as a large truck or trailer or a normal vehicle. The default speed limits applicable to normal vehicles may be changed by specifying an alternative type of vehicle, such as a large truck or trailer. This vehicle type information may then be sent to the Speed Limit Database Management System such that the correct speed limit data particular to the type of vehicle is provided to the Control Unit. The Control Unit sends the vehicle's location data, optionally, the vehicle's type, and, optionally, the current local time and date to the Speed Limit Database Management System. The Speed Limit Database Management System, in turn, sends back the applicable speed limit of the current road, which is provided to the driver by the Speed Limit Indicator. If the vehicular speed derived from the Speed Detector is greater than the speed limit, the Control Unit then sends the appropriate signals to activate the Speed Alerter and/or the Speed Reducer. If the vehicular speed derived from the Speed Detector is greater than the speed limit or does not meet a minimum speed threshold, the Control Unit records speeding data, with DID and other applicable information, into the Speed Limit Violation Logger. If the vehicle's speed falls at or under the applicable speed limit of the current road, the Control Unit sends the appropriate signals to deactivate the Speed Alerter and/or the Speed Reducer, if they are currently activated. The Control Unit continuously performs its operations while the vehicle is in motion, unless it is explicitly shut off.

If the Control Unit is required to send the current local time and date to the Speed Limit Database Management System, the Control Unit may derive such information from a clock that is equipped with both time and date information and is located either within the Control Unit or exists as an external device.

If desired, the Control Unit may be configured to activate the Speed Alerter at certain speeds above or below the actual speed limit. For example, a parent whose child is beginning to learn how to drive may configure the Control Unit to activate the Speed Alerter and, optionally, the Speed Reducer when the vehicle's speed comes within five (5) mph of the actual speed limit (e.g. at 30 mph on a road with a 35 mph speed limit). Alternatively, an experienced driver who feels comfortable traveling at a speed slightly over the limit may configure the Control Unit such that it activates the Speed Alerter and/or the Speed Reducer, only when the vehicle's speed exceeds the actual speed limit by a custom-defined value. In all cases, the GPS Device, Speed Detector, Speed Limit Database Management System, Speed Limit Indicator, Speed Alerter, Speed Reducer, Driver Identification System, Speed Limit Violation Logger, and Control Unit all continue to work in sync, with the Control Unit determining at what configured speed(s) above or below the actual speed limit the Speed Alerter and/or the Speed Reducer should be activated.

The Control Unit may also collect information about current weather conditions in the nearby vicinity of the vehicle and use this information when providing instructions to the Speed Indicator, Speed Alerter, and Speed Reducer to enhance the driver's safety in dangerous weather conditions. This weather data may be procured in several ways, such as through the use of sensors around the vehicle to determine the presence of ice, wind, fog, rain, snow, hail, or sleet. The information within the vehicle that is used to implement rain-sensing variable speed wipers can also be used by the SPIRAL System. Also, slip-sensing technology is incorporated into many modern vehicles as part of systems known as "dynamic stability control" systems, whereby information on slippage of the tires relative to the road is acquired from the sensors that also are used to implement anti-lock braking. Dynamic stability control systems, specifically the slip-sensing technology used in those systems, may also be used for weather condition detection purposes.

Data on local weather conditions may also be procured through the weather information provided by an online weather database, such as those provided by popular Internet weather-related websites; or through other means. Based on this weather data, including the severity of any extreme weather conditions detected, the Control Unit may make a determination to provide the driver with a "safe speed limit" lower than the posted speed limit of the current road being traversed, as stored in the Speed Limit Database Management System and provided to the Control Unit. Such a "safe speed limit" may be either advisory or mandatory. If following such a "safe speed limit" is determined to be more beneficial for the safety of the driver than if he or she were simply to obey the posted speed limit, the Control Unit may send this "safe speed limit" to the Speed Limit Indicator, Speed Alerter, and Speed Reducer, which then use the "safe speed limit," rather than the posted speed limit, to perform their operations. This weather-based information, coupled with the type of vehicle and the other information provided by the Speed Limit Database Management System, allows the Speed Limit Indicator, Speed Alerter, and Speed Reducer to work better. For example, suppose a driver is driving on a freeway through extremely stormy conditions, including a huge downpour of rain and high winds. The Control Unit may detect these extreme weather conditions through the use of sensors, information gathered from an online database or other source of current weather status, or another source, or a combination of information procured from different sources. Once this weather information is processed, the Control Unit may set the "safe speed limit" on the freeway currently being traversed by the vehicle at 50 mph, 15 mph less than the normally posted speed limit of 65 mph. This new speed limit data is sent to the Speed Limit Indicator, Speed Alerter, and Speed Reducer, which all work to assist the driver in maintaining a safe speed under the assumption that the current speed limit is 50 mph. The Control Unit's handing of weather conditions may be user-configurable in several ways. For example, the user could set it to reduce the speed limit by a specific amount under the posted speed limit depending on the weather conditions; or, alternatively, the weather condition function of the Control Unit may be toggled on and off.

Furthermore, the Control Unit may be configured such that the Speed Alerter and/or the Speed Reducer are activated only if the speed limit is exceeded by the vehicle for the full duration of a certain temporary period of time. For example, a driver may configure the Control Unit such that the Speed Alerter and/or the Speed Reducer are activated only if the vehicle violates the speed limit for at least ten (10) continuous seconds. In this case, if the vehicle's speed exceeds the current speed limit for a duration of time less than ten (10) seconds (for instance, six [6] seconds), the Speed Alerter and/or the Speed Reducer, will not be activated. This option allows for situations where a temporary increase in speed may be necessary while an alert is not desired; for example, a driver may need to speed up in order to overtake another vehicle while changing lanes or in order to merge into traffic.

Configurations of the SPIRAL System's Components

While the different components/functionalities that comprise the SPIRAL System have, for the most part, been described thus far as separate entities, they may be combined together in a variety of physical configurations. Although there exist thousands of different possible combinations (and only a fraction of those are shown here), the essential function of the SPIRAL System remains the same in each one; only the physical arrangements differ within the different combinations shown below. The diagrams in the figures and the descriptions that follow show some of the possible configurations of the SPIRAL System's components/functionalities, including options for physical packaging. Note that the different components of the SPIRAL System have been abbreviated in the following manners:

GPS Device=GPS
Speed Limit Database Management System=SLDBMS
Speed Detector=SD
Speed Alerter=SA
Speed Limit Indicator=SLI
Speed Reducer=SR
Driver Identification System=DID
Speed Limit Violation Logger=SLVL
Control Unit=CU Furthermore, note in the diagrams depicted in FIGS. 4 through 16 that include the SLI and SR, these components (the SLI and SR) may or may not be present in the actual implementation of the system. In general, the diagrams in FIGS. 4 through 16 may or may not include one or more of the components/functionalities shown in FIG. 2. However, it is understood that any of the components or functionalities shown in FIG. 2 may still be present in an actual implementation of the system.

Figure 4:
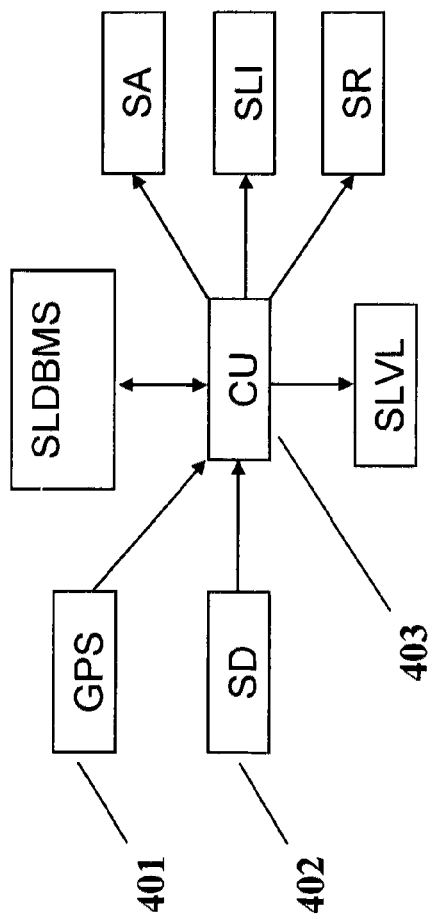
FIG. 4 shows one possible functional configuration of the SPIRAL System.

In FIG. 4, the GPS, SLDBMS, SD, SA, SLI, SR, SLVL, and CU all exist as separate entities. As indicated by the arrows, the GPS 401 and SD 402 each communicate separately with the CU 403. The CU sends and receives information from the SLDBMS and sends signals and/or commands to the SA, SLI, SR, and SLVL.

Figure 5:
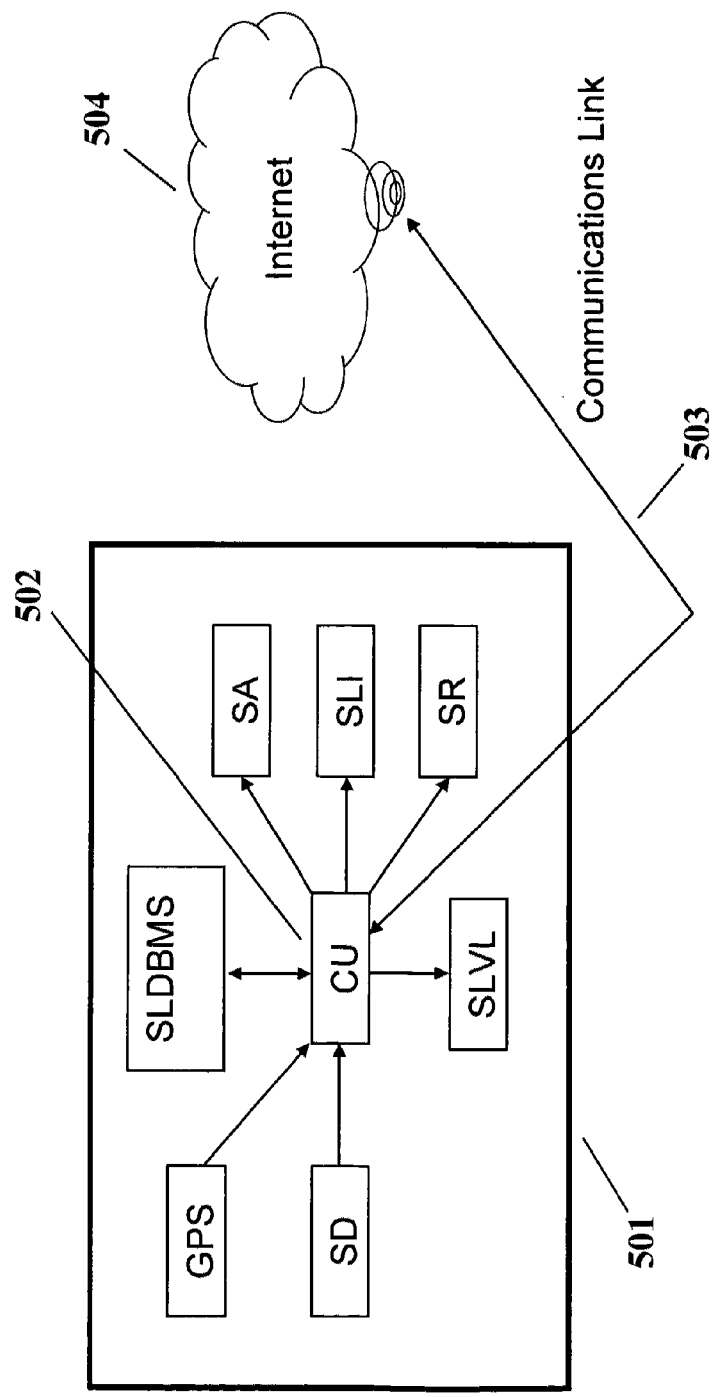
FIG. 5 shows one possible functional configuration of the SPIRAL System.

In FIG. 5, the GPS, SLDBMS, SD, SA, SLI, SR, SLVL, and CU are all co-located within one multi-functional device 501. This multifunctional device may be created by adding the functionality of an SLDBMS, an SD, an SA, an SLI, an SR, an SLVL, and a CU to a device that is already GPS-enabled. As indicated by the arrows, the GPS and SD each communicate separately with the CU. The CU sends and receives information from the SLDBMS and sends signals and/or commands to the SLI, SA, SR, and SLVL. In addition, the CU 502 may also communicate externally to the vehicle by way of a communications link 503 that in some embodiments may provide communication by way of the Internet 504.

Figure 6:
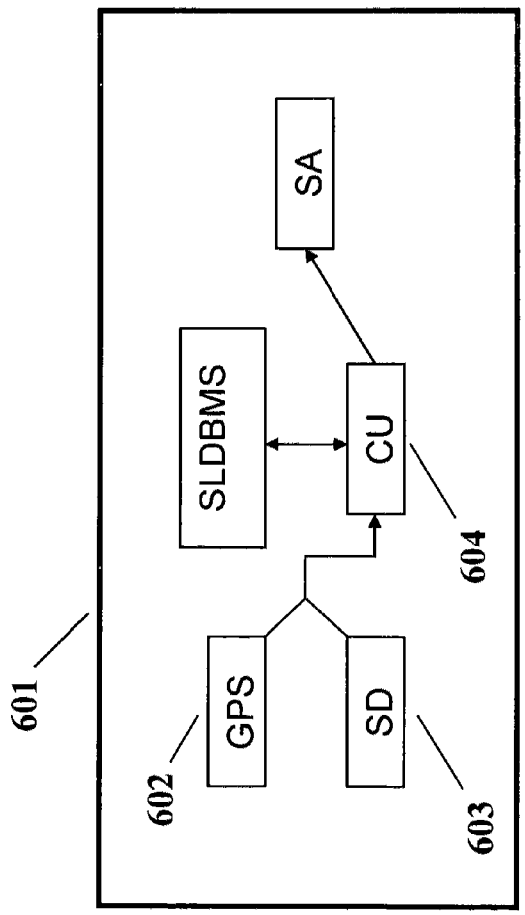
FIG. 6 shows one possible functional configuration of the SPIRAL System.

In FIG. 6, the GPS, SLDBMS, SD, SA, and CU are all co-located within one multi-functional device 601. This multifunctional device may be created by adding the functionality of an SLDBMS, an SD, an SA, and a CU to a device that is already GPS-enabled. As indicated by the arrows, the GPS 602 and SD 603 both communicate at the same time with the CU 604. The CU sends and receives information from the SLDBMS and sends signals to activate or deactivate the SA.

Figure 7:
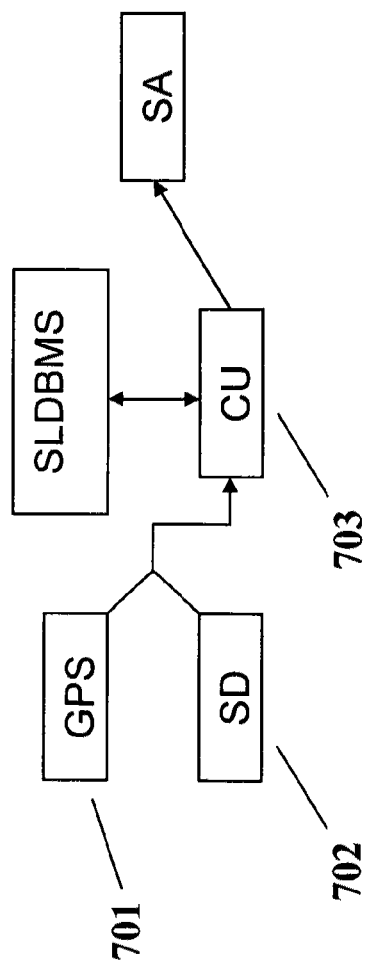
FIG. 7 shows one possible functional configuration of the SPIRAL System.

In FIG. 7, the GPS, SLDBMS, SD, SA, and CU all exist as separate entities. As indicated by the arrows, the GPS 701 and SD 702 both communicate at the same time with the CU 703. The CU sends and receives information from the SLDBMS and sends signals to activate or deactivate the SA.

Figure 8:
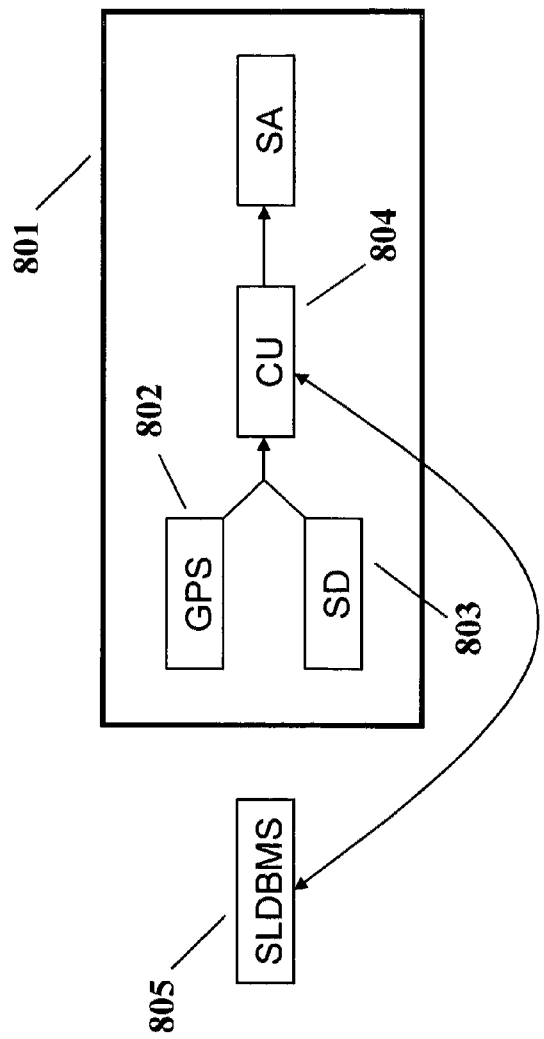
FIG. 8 shows one possible functional configuration of the SPIRAL System.

In FIG. 8, the GPS, SD, CU, and SA are all co-located within one multi-functional device 801, while the SLDBMS exists independently of the GPS, SD, CU, and SA. This multifunctional device may be created by adding the functionality of an SD, an SA, and a CU to a device that is already GPS-enabled. As indicated by the arrows, the GPS 802 and SD 803 both communicate at the same time with the CU 804. The CU 804 sends and receives information from the SLDBMS 805 (a separate device) and sends signals to activate or deactivate the SA.

Figure 9:
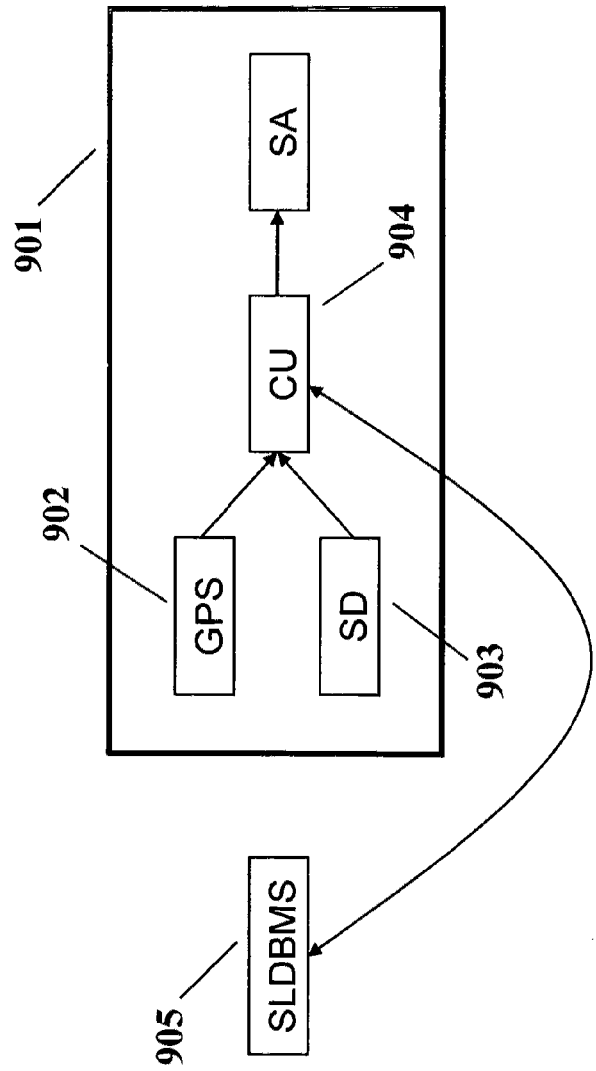
FIG. 9 shows one possible functional configuration of the SPIRAL System.

In FIG. 9, the GPS, SD, CU, and SA are all co-located within one multi-functional device 901, while the SLDBMS exists independently of the GPS, SD, CU, and SA. This multifunctional device may be created by adding the functionality of an SD, an SA, and a CU to a device that is already GPS-enabled. As indicated by the arrows, the GPS 902 and SD 903 each communicate separately with the CU 904. The CU sends and receives information from the SLDBMS 905 (a separate device) and sends signals to activate or deactivate the SA.

Figure 10:
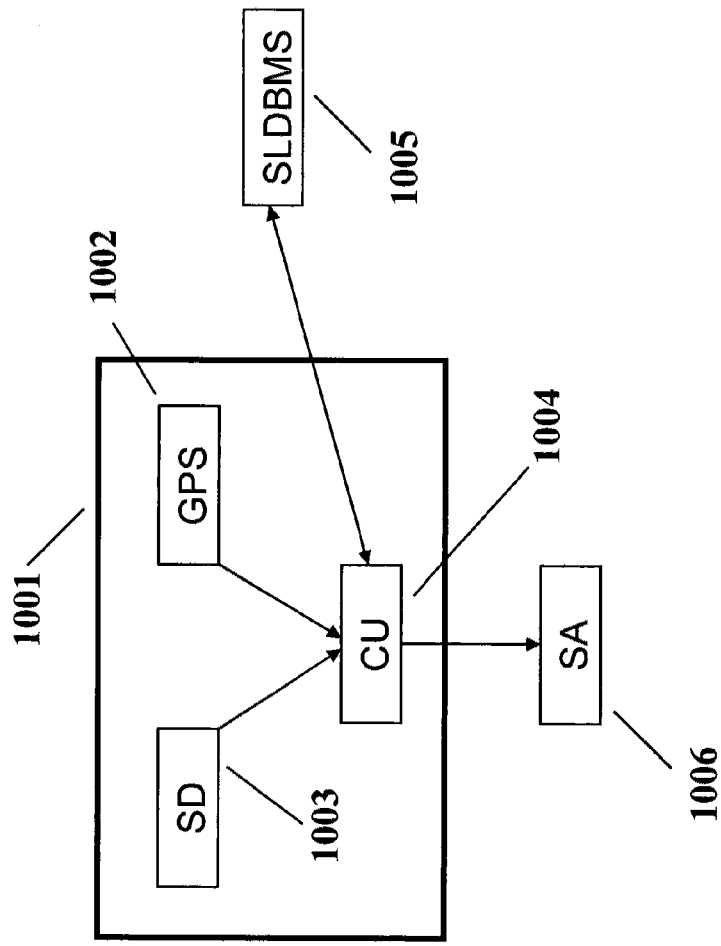
FIG. 10 shows one possible functional configuration of the SPIRAL System.

In FIG. 10, the GPS, SD, and CU are all co-located within one multi-functional device 1001, while both the SLDBMS and the SA exist independently of the GPS, SD, and CU. This multifunctional device may be created by adding the functionality of an SD and a CU to a device that is already GPS-enabled. As indicated by the arrows, the GPS 1002 and SD 1003 each communicate separately with the CU 1004. The CU sends and receives information from the SLDBMS 1005 (a separate device) and sends signals to activate or deactivate the SA 1006 (another separate device).

Figure 11:
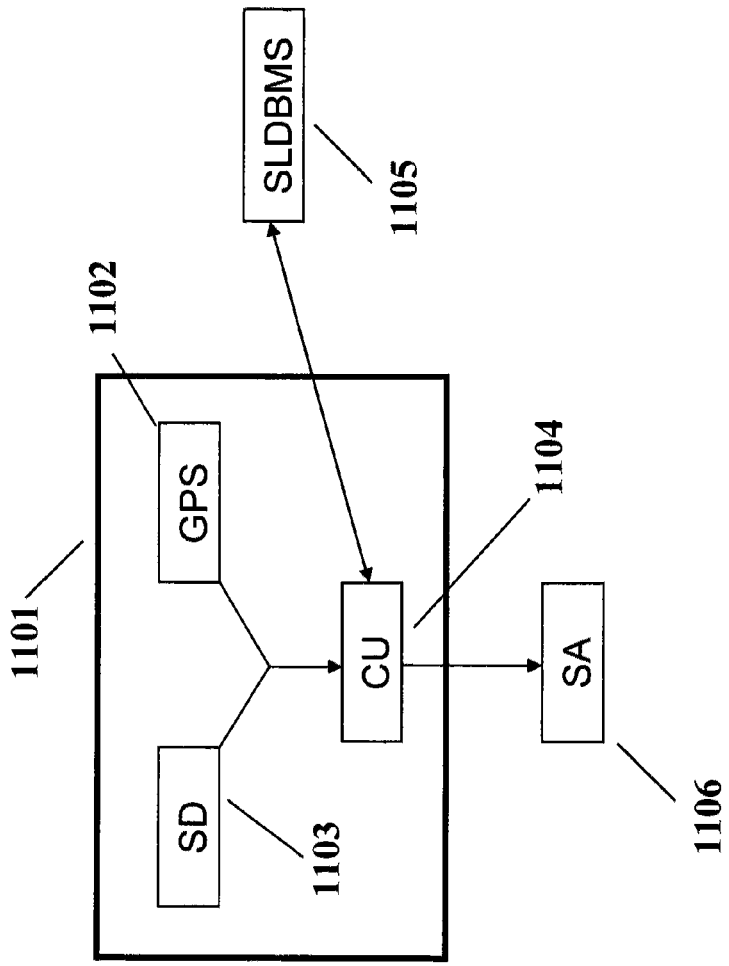
FIG. 11 shows one possible functional configuration of the SPIRAL System.

In FIG. 11, the GPS, SD, and CU are all co-located within one multi-functional device 1101, while both the SLDBMS and the SA exist independently of the GPS, SD, and CU. This multifunctional device may be created by adding the functionality of an SD and a CU to a device that is already GPS-enabled. As indicated by the arrows, the GPS 1102 and SD 1103 both communicate at the same time with the CU 1104. The CU sends and receives information from the SLDBMS 1105 (a separate device) and sends signals to activate or deactivate the SA 1106 (another separate device).

Figure 12:
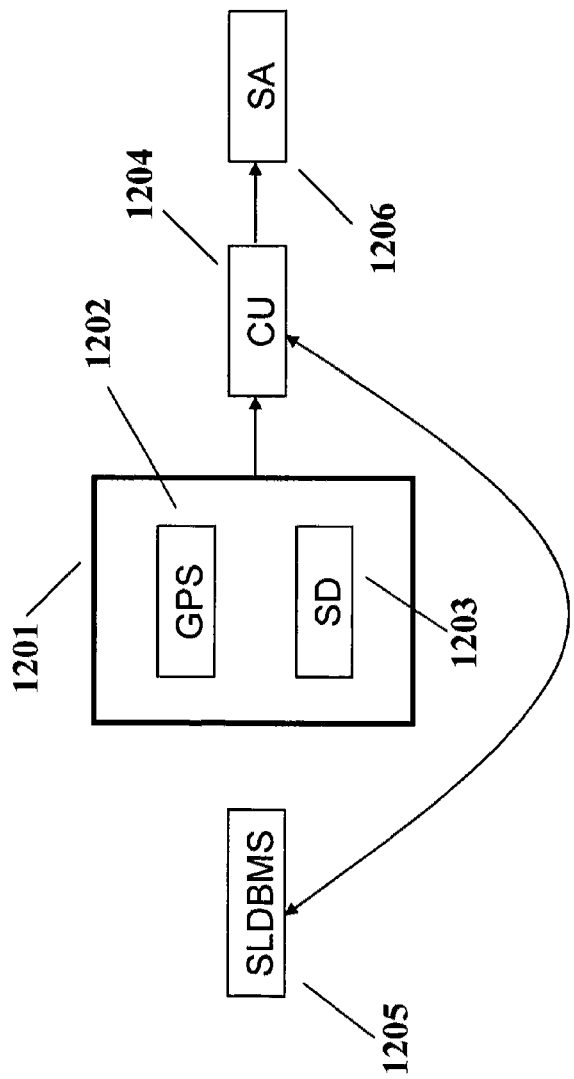
FIG. 12 shows one possible functional configuration of the SPIRAL System.

In FIG. 12, the GPS and SD are both co-located within one multi-functional device 1201, while the SLDBMS, the SA, and the CU exist independently of the GPS and SD. This multifunctional device may be created by adding the functionality of an SD to a device that is already GPS-enabled. As indicated by the arrows, the GPS 1202 and SD 1203 (both of which exist within a single entity 1201) both communicate at the same time with the CU 1204. The CU sends and receives information from the SLDBMS 1205 (a separate device) and sends signals to activate or deactivate the SA 1206 (another separate device).

Figure 13:
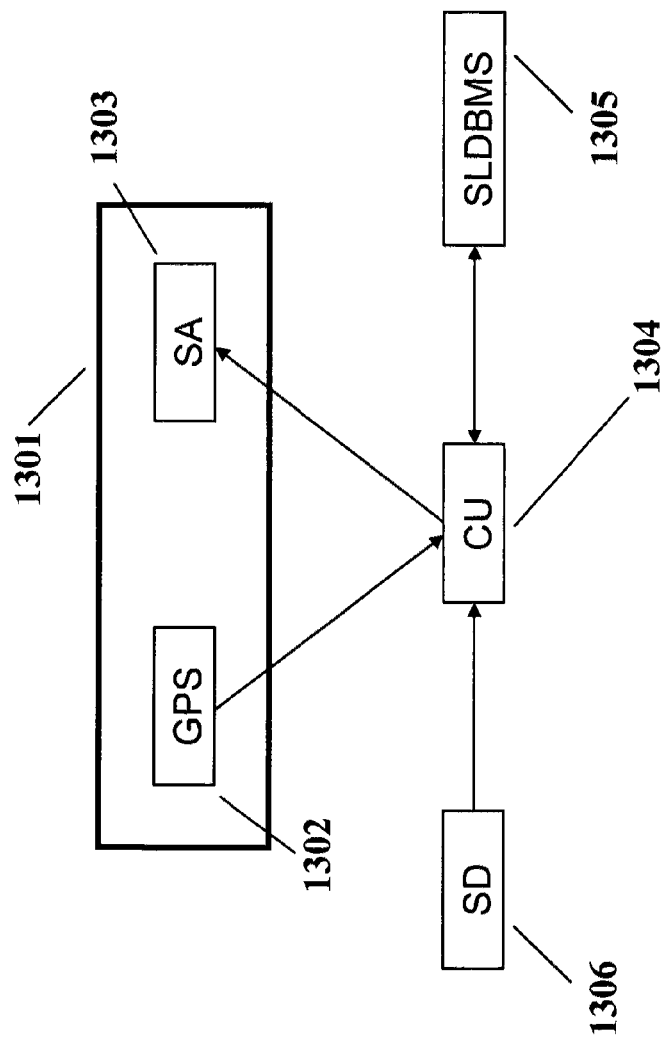
FIG. 13 shows one possible functional configuration of the SPIRAL System.

In FIG. 13, the GPS and SA are both co-located within one multi-functional device 1301, while the SLDBMS, the SD, and the CU exist independently of the GPS and SA. This multifunctional device may be created by adding the functionality of an SA to a device that is already GPS-enabled. As indicated by the arrows, the GPS 1302 and SD 1303 (both of which reside within different entities) each communicate separately with the CU 1304. The CU sends and receives information from the SLDBMS 1305 (a separate device) and sends signals to activate or deactivate the SA 1306 (another separate device).

Figure 14:
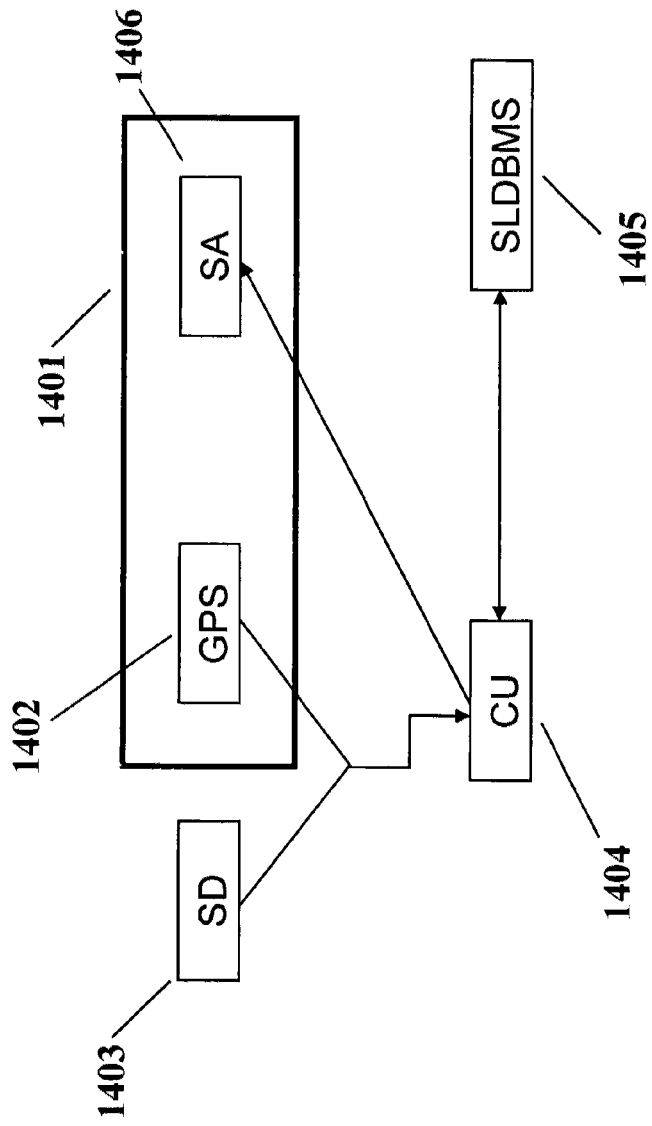
FIG. 14 shows one possible functional configuration of the SPIRAL System.

In FIG. 14, the GPS and SA are all co-located within one multi-functional device 1401, while the SLDBMS, the SD, and the CU exist independently of the GPS and SA. This multifunctional device may be created by adding the functionality of an SA to a device that is already GPS-enabled. As indicated by the arrows, the GPS 1402 and SD 1403 (both of which reside within different entities) both communicate at the same time with the CU 1404. The CU sends and receives information from the SLDBMS 1405 (a separate device) and sends signals to activate or deactivate the SA 1406 (another separate device).

Figure 15:
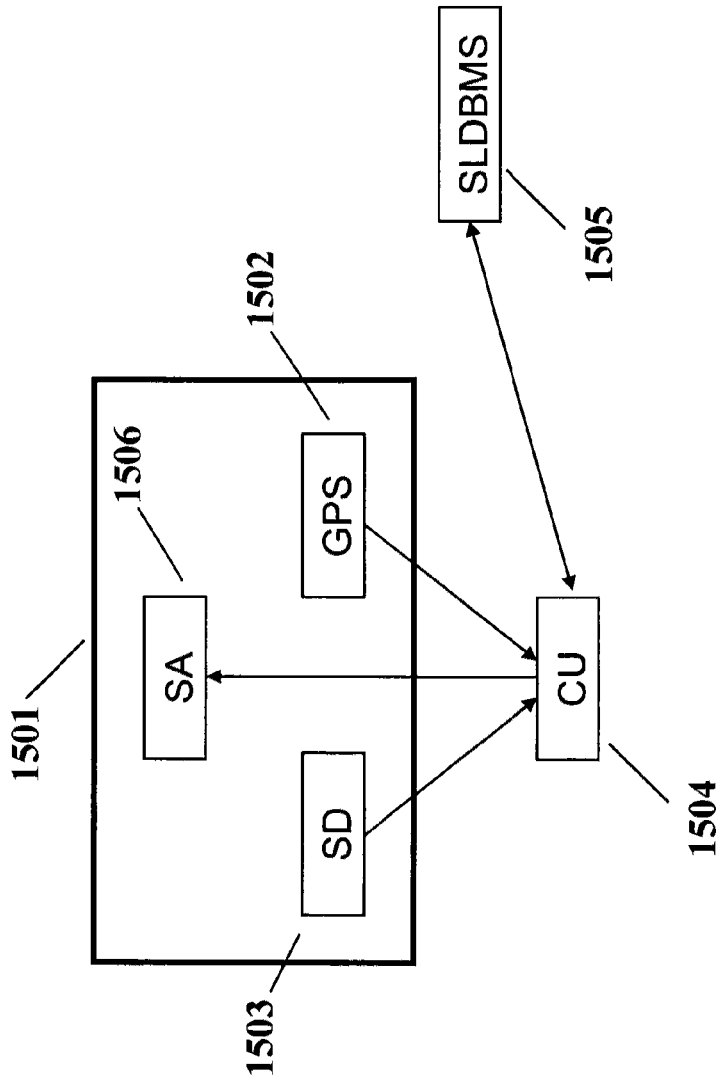
FIG. 15 shows one possible functional configuration of the SPIRAL System.

In FIG. 15, the GPS, SD, and SA are all co-located within one multi-functional device 1501, while the SLDBMS and the CU exist independently of the GPS, SD, and SA. This multifunctional device may be created by adding the functionality of an SD and an SA to a device that is already GPS-enabled. As indicated by the arrows, the GPS 1502 and SD 1503 (both of which, along with the SA, reside within the same entity) each communicate separately with the CU 1504. The CU sends and receives information from the SLDBMS 1505 (a separate device) and sends signals to activate or deactivate the SA 1506 (which resides in the same entity as the GPS and SD).

Figure 16:
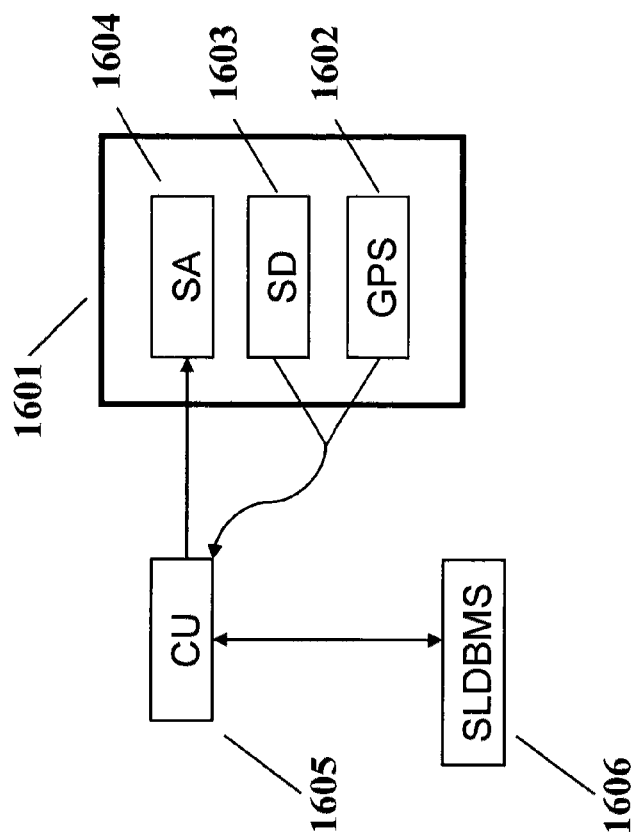
FIG. 16 shows one possible functional configuration of the SPIRAL System.

In FIG. 16, the GPS, SD, and SA are all co-located within one multi-functional device 1601, while the SLDBMS and the CU exist independently of the GPS, SD, and SA. This multifunctional device may be created by adding the functionality of an SD and an SA to a device that is already GPS-enabled. As indicated by the arrows, the GPS 1602 and SD 1603 (both of which, along with the SA 1604, reside within the same entity 1601) both communicate at the same time with the CU 1605. The CU sends and receives information from the SLDBMS 1606 (a separate device) and sends signals to activate or deactivate the SA (which resides in the same entity as the GPS and SD).

Figure 17:
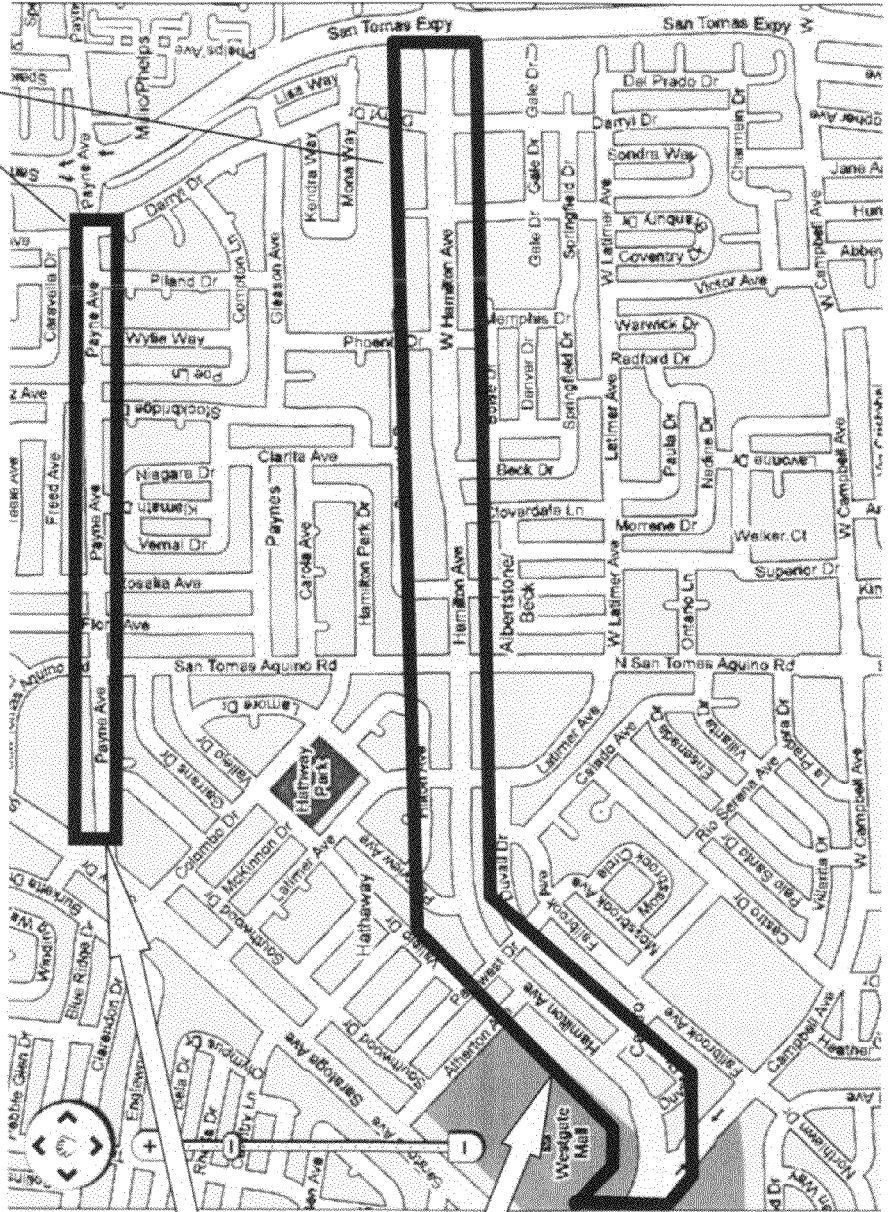
FIG. 17 shows an example of a map display providing annotated feedback to the driver. In this case, the figure shows areas where the driver has exceeded the speed limits by the degrees shown.

A log of alert condition data from the SPIRAL System that relates to a driver's pattern of driving behavior over time may be displayed to the driver, other individuals, or an external organization either as textual data or, alternatively, with a geographical orientation by means of a map display. An example of such a map display 1701 is shown in FIG. 17. Map displays may be annotated with attribute information related to alert conditions, such as the weather condition(s), the location of the speeding violation(s), applicable speed limit(s), the severity of the violation(s), driver identity (identities), and other parameters. In particular, FIG. 17 shows to geographical areas 1702 where the driver on average exceeded the speed limit by the degrees 1703 shown. Such a map display may be shown within the vehicle by the SPIRAL System itself or alternately by an existing display in the vehicle or a GPS display. In addition, such a map display may also be made available to the driver and/or other individuals via an online Internet connection or other communications means and may also be made available to an external organization or organizations.

Figure 18:
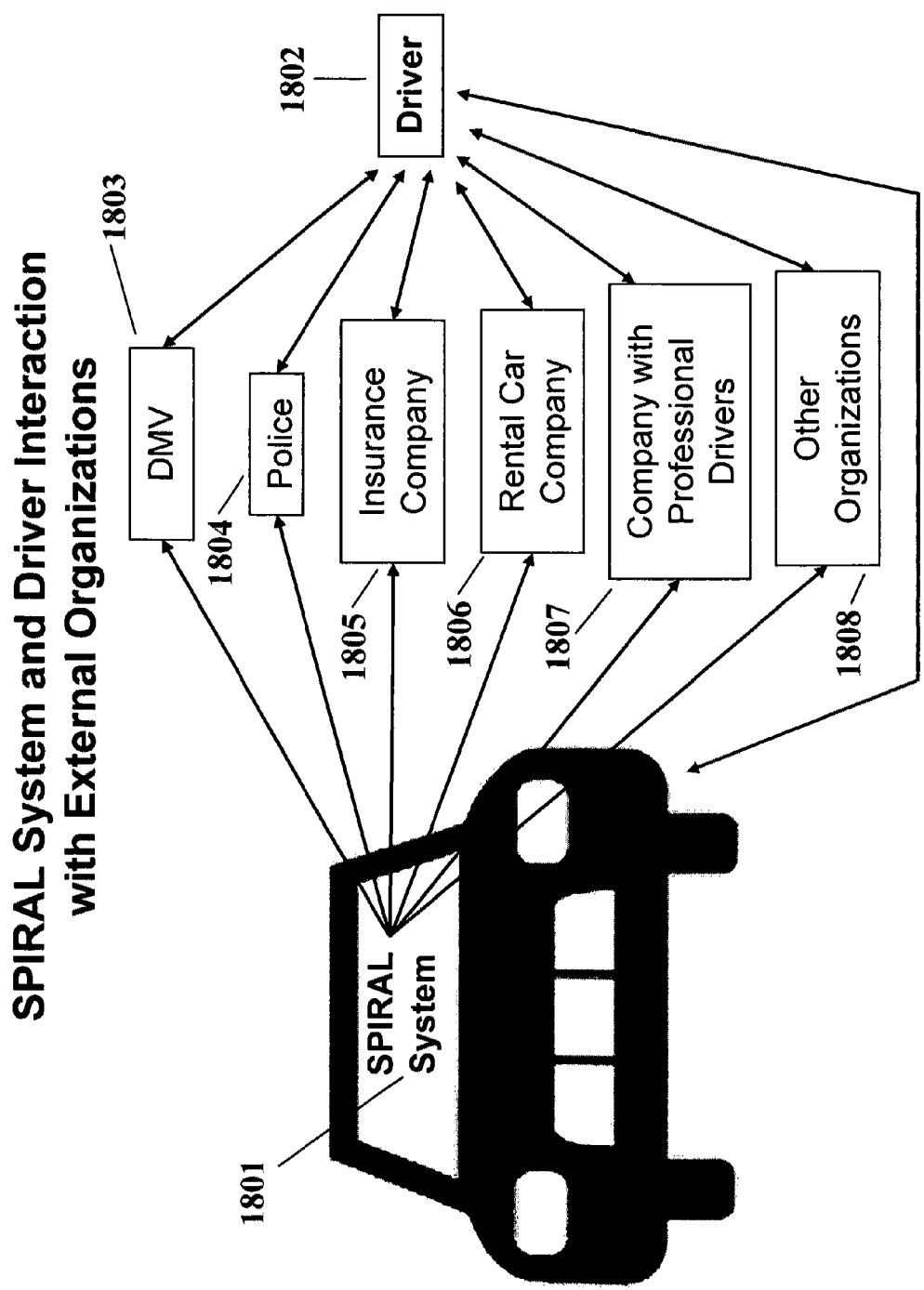
FIG. 18 shows the flow of possible interactions between a driver and different examples of external organizations whereby interactions are facilitated by the SPIRAL System.

FIG. 18 describes the flow of information between the SPIRAL System, the driver of the vehicle, and a number of external organizations with which the driver and the SPIRAL System may interact, and whereby as a result of this interaction, the driver may receive some form of conditional treatment from the external organization. From the perspective of the driver, this conditional treatment may be a positive or negative experience, or may include both positive and negative aspects. First, the driver may interact with a DMV (Department of Motor Vehicles) 1803 and/or a police organization 1804 relative to driver licensing issues and/or speeding and other traffic violations.

Government Organizations

Relative to government organizations such as law enforcement agencies, the system described herein can be used to monitor a driver who is under a probationary status to determine if he or she is consistently driving in a safe manner, and therefore deserves special considerations in return. One example of such a probationary status might be a person whose driver's license has been suspended for a severe moving violation, or multiple moving violations, but with proof of safe driving may be allowed to continue to drive as long as he or she meets a set of probationary rules. This would allow a person to keep driving when an inability to drive would cause severe hardship to himself or herself or the driver's family. Another probationary scenario might include a new driver who is operating under a learner's permit or a provisional, age-restricted license for young people. Often these new drivers and/or young drivers are restricted to operate with certain restrictions with regard to time of day and or the presence of an appropriate licensed driver riding with them. If the system described herein is attached to new and/or young drivers' vehicles and is in communication with the local DMV (Department of Motor Vehicles), it could be used to monitor the behavior of individuals operating under a learner's permit or a provisional license and therefore allow them more freedom given that they adhere to a set of probationary rules. It may also enable them to transition to a full driver's license at an earlier time.

When the SPIRAL System is present in a vehicle, law enforcement agencies can use transmitted speed log information not only for initiating and maintaining a probationary period, but could also use the speed log information for issuing warnings or even tickets. Another age-related probationary process that can take advantage of the SPIRAL System involves the elderly. In some states and countries, drivers may lose their licenses after passing a certain age. A probationary process using the SPIRAL System can be implemented to allow elderly drivers to continue driving under probation. This may include not only that they obey the speed limits, but that they also maintain a minimum rate of speed that safely keeps up with traffic. Thus, for drivers where it is desired to measure their ability to keep up with traffic, there would be two speed thresholds for determining alert conditions—an upper speed threshold for determining if they are speeding and a lower speed threshold for determining if they are keeping up with traffic.

The data logged by the SPIRAL System over a period of time may be used to determine if such a driver has, in fact, maintained an acceptable minimum rate of speed. A challenge exists, however, in that an acceptable minimum rate of speed must be determined relative to traffic conditions. A solution to this challenge is to develop over time a database of typical speeds traveled by motorists on each segment of road and at each time of day and day of the week. If the road is populated with sensors for determining such information, such as freeways where sensing systems are installed for the purpose of reporting traffic densities and speeds, then this data can be used to compare the average speed of traffic for a given day and time in order to determine a minimum acceptable speed for the driver in question. Alternately, should a multitude of SPIRAL Systems be deployed over a certain geographical area, data may be collected in aggregate from a number of SPIRAL Systems installed in different vehicles to provide a baseline for minimum acceptable speeds at a given time and location. If the availability of such data is minimal, then an average of speeds may be used to calculate an acceptable minimum. However, if the SPIRAL System is deployed in sufficient numbers, the probability increases that other vehicles so equipped will be present on the same segment of road and in the same timeframe as the driver in question in order to use data from those other vehicles as a basis for comparison.

The SPIRAL System may also be used to report to government/DMV agencies the cumulative distance (miles or kilometers) driven for a particular vehicle in addition to the pattern of driving behavior of the driver. Drivers may then be taxed (DMV renewal for a particular vehicle) according to the cumulative distance driven with a particular vehicle, and also may have registration fee rate reductions on one or more vehicle(s) according to proof of safe driving provided through SPIRAL System data logs that have been automatically supplied to the government/DMV agency. When a driver's vehicle is equipped with the SPIRAL System, the driver may also be issued tickets for speeding based on alert condition logs supplied by the System.

Insurance Companies

Relative to insurance companies 1805, the system described herein can log parameters indicating a driver's speeding behavior and automatically report this data to an insurance company. In return, the insurance company may provide reduced premium rates for that individual. Regarding the ability to mitigate restrictions or penalties imposed on a driver after he or she has had speeding violations and/or accidents, the present invention may be used to monitor such a driver in a probationary sense, providing ongoing information to an insurance company regarding the driver's safe pattern of driving behavior, thus enabling the driver to avoid an increase in premiums as a result of an accident or moving violation record as long as he or she adheres to a set of probationary rules relative to his or her driving behavior. Should a driver habitually speed while being monitored by the SPIRAL System, the insurance company may decide to increase the driver's premiums instead.

Rental Car Companies

Companies that loan vehicles to drivers (such as rental car companies 1806) may use the SPIRAL System to monitor driving behavior as well as use the speed data to determine the rental charges incurred by a driver. Beyond a certain age, individuals sometimes become ineligible to rent from some car rental companies. The installation of the SPIRAL System on a rental car could enable rental car companies that would normally not rent to elderly persons beyond a certain age limit to allow elderly persons to rent with probationary treatment as long as their driving habits—as logged and reported by the SPIRAL System—are within the limits of certain rules. Rental car companies also act as insurance companies when they offer insurance to renters. As such, a rental car company may use the SPIRAL System to offer reduced insurance rates in return for proof of a driver's safe driving behavior—or may increase insurance rates if the driver's driving behavior is unsatisfactory or does not meet certain requirements.

Companies that Employ Professional Drivers

A commercial trucking company or any company 1807 that uses professionally-driven vehicles for transporting goods or people (such as a bus, taxi, or limousine driving service company) can use the SPIRAL System for monitoring its drivers to determine how safe the drivers' patterns of driving behavior are. Rewards of punishment may be provided commensurate with driving behavior. Besides the specific examples of organizations shown in FIG. 18, the SPIRAL System may be similarly used to enhance or facilitate the interactions of drivers with other organizations 1808.

Figure 19:
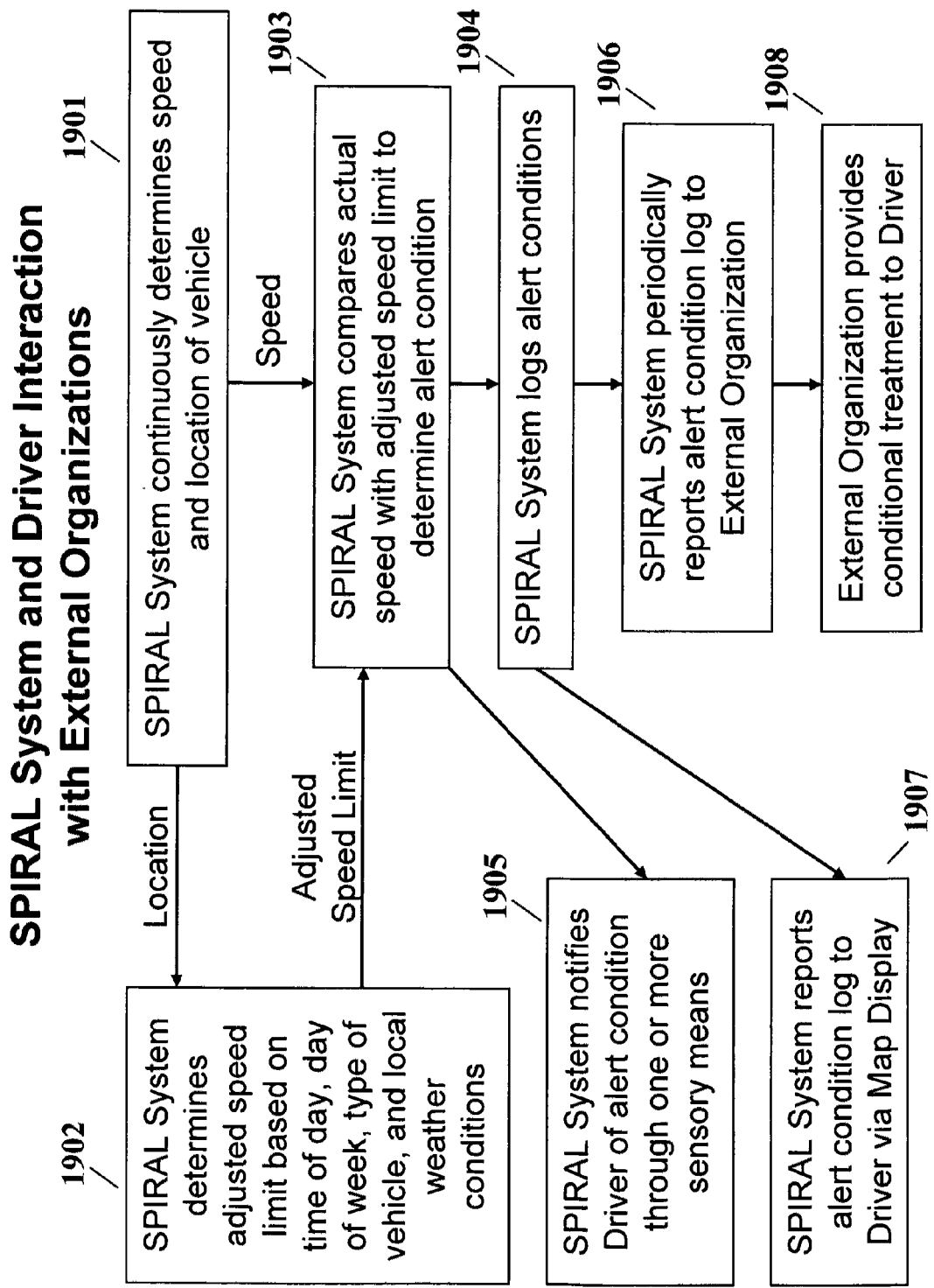
FIG. 19 shows a flow chart for one possible interaction scenario between a driver and an external organization whereby interactions are facilitated by the SPIRAL System.

FIG. 19 shows a flowchart describing the steps for an example interaction between a driver, the SPIRAL System, and an external organization. First, when the vehicle is operated, the SPIRAL System continually determines 1901 the speed and location of the vehicle. The vehicle location is then used by the SPIRAL System to access a database and determine 1902 the speed limit based on the time of day, day of the week, type of vehicle, and in some implementations, local weather conditions or other appropriate parameters. The speed limit may be the actual legal speed limit given the above parameters, or may be an adjusted or advisory speed limit that has been altered based on parameters such as local weather conditions and/or user input(s). The SPIRAL System then uses the speed limit or adjusted speed limit to compare 1903 the speed limit with the vehicle's actual speed in order to determine if an alert condition exists. Should an alert condition exist, the SPIRAL System may log 1904 that alert condition, and also may notify 1905 the driver of the alert condition through one or more sensory means. The SPIRAL System may periodically report 1906 an alert condition log to an external organization, and may also at an appropriate time report 1907 an alert condition log to the driver or other individuals by way of a textual representation or alternately by way of an annotated map display. Finally, the external organization that previously received an alert condition log may provide 1908 some form of conditional treatment to the driver in question.

Thus, the Speed Reporting Process for Providing Conditional Driver Treatment, described herein, solves the long-lasting problem of drivers being ignorant of violating speed limits and thereby presenting a danger to themselves and the people around them. The system utilized therein may be used to enhance or facilitate interactions between drivers and external organizations such as government/law enforcement, insurance companies, rental car companies, and companies that employ professional drivers. Finally, studies have consistently shown that drivers who obey the speed limit save not just fuel and help the environment, but save lives as well.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A method for providing conditional treatment to a motor vehicle driver with respect to his or her interactions with an organization, comprising the steps of:
   identifying whether the driver is subject to one or more probationary rules;
   continuously determining a speed, a location and a speed limit for the location of a vehicle being driven by said driver;
   determining an alert condition by determining whether the speed of the vehicle exceeds the speed limit for the location, or whether there is an infraction of the one or more probationary rules;
   tracking speed log information, including alert conditions, speeds of the vehicle for different locations and associated speed limits for the different locations;
   determining driving behavior of the driver based on the speed log information and the one or more probationary rules;
   periodically transmitting the speed log information and the driving behavior to said organization;
   adjusting speed thresholds for determining alert conditions according to a type of the vehicle;
   adjusting speed thresholds for determining alert conditions according to the time of day, day of the week, or date;
   adjusting speed thresholds for determining alert conditions according to local weather conditions; and
   providing an adjusted speed limit indication to the driver based on the vehicle type, the time of day, the day of the week, date, and local weather conditions.

2. The method of claim 1, wherein an alert condition may be deferred for a temporary period of time.

3. The method of claim 1, wherein the one or more probationary rules include restrictions on operating the vehicle during certain parts of a day.

4. The method of claim 1, wherein the one or more probationary rules include a presence of an appropriate licensed driver.

5. The method of claim 1, wherein the one or more probationary rules specify a minimum rate of speed of the vehicle for certain locations.

6. The method of claim 1, further comprising identifying the driver of the vehicle using an identification system.

7. The method of claim 6, wherein the identification system is an image recognition camera.

8. The method of claim 6, wherein the identification system is a biometric device.

9. The method of claim 8, wherein the biometric device is a fingerprint reader.

10. The method of claim 8, wherein the biometric device is a retina scanner.

11. The method of claim 1, further comprising automatically reducing the speed of the vehicle in response to an alert condition.

12. The method of claim 1, further comprising providing an alert notification to the driver, including at least one of an audible, visual, kinesthetic, or olfactory indication.

13. The method of claim 12, further comprising automatically adjusting an intensity of the alert notification to the driver in response to a severity of an alert condition.

14. The method of claim 12, further comprising automatically adjusting an intensity of the alert notification to the driver in response to ambient conditions of the driver's environment.

15. A method for providing conditional treatment of a motor vehicle driver with respect to his or her interactions with an organization, comprising the steps of:

identifying whether the driver is subject to one or more probationary rules;

continuously determining a speed, a location and a speed limit for the location of a vehicle being driven by said driver;

determining an alert condition by determining whether the speed of the vehicle exceeds the speed limit for the location or a speed threshold, or whether there is an infraction of the one or more probationary rules;

tracking speed log information, including alert conditions, speeds of the vehicle for different locations and associated speed limits for the different locations;

determining driving behavior of the driver based on the speed log information and the one or more probationary rules;

periodically transmitting the speed log information and the driving behavior to said organization;

displaying locations of alert conditions on a map display along with information representing one or more attributes regarding the alert conditions;

adjusting speed thresholds for determining alert conditions according to a type of the vehicle;

adjusting speed thresholds for determining alert conditions according to the time of day, day of the week, or date;

adjusting speed thresholds for determining alert conditions according to local weather conditions; and providing an adjusted speed limit indication to the driver based on the vehicle type, the time of day, the day of the week, date, and local weather conditions.

16. The method of claim 15, wherein an alert condition may be deferred for a temporary period of time.

17. The method of claim 15, wherein the one or more probationary rules include restrictions on operating the vehicle during certain parts of a day.

18. The method of claim 15, wherein the one or more probationary rules include a presence of an appropriate licensed driver.

19. The method of claim 15, wherein the one or more probationary rules specify a minimum rate of speed of the vehicle for certain locations.

20. The method of claim 15, further comprising identifying the driver of the vehicle using an identification system.

* * * * *